(12) United States Patent
Jing et al.

(10) Patent No.: US 12,250,712 B2
(45) Date of Patent: Mar. 11, 2025

(54) CONTROL RESOURCE ALLOCATION METHOD, APPARATUS, ELECTRONIC DEVICE AND READABLE STORAGE MEDIUM

(71) Applicant: Samsung Electronics Co., Ltd., Suwon-si (KR)

(72) Inventors: Meifang Jing, Beijing (CN); Mei Liu, Beijing (CN); Hui Chen, Beijing (CN); Weili Cui, Beijing (CN); Yanyan Qi, Beijing (CN); Zhiqing Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 17/717,524

(22) Filed: Apr. 11, 2022

(65) Prior Publication Data

US 2022/0338201 A1     Oct. 20, 2022

Related U.S. Application Data

(63) Continuation of application No. PCT/KR2022/002534, filed on Feb. 21, 2022.

(30) Foreign Application Priority Data

Apr. 16, 2021   (CN) .......................... 202110414197.3

(51) Int. Cl.
  *H04W 72/563*   (2023.01)
  *H04W 72/0446*  (2023.01)
  (Continued)

(52) U.S. Cl.
  CPC ..... *H04W 72/563* (2023.01); *H04W 72/0446* (2013.01); *H04W 72/0453* (2013.01); *H04W 72/20* (2023.01)

(58) Field of Classification Search
  None
  See application file for complete search history.

(56) References Cited

U.S. PATENT DOCUMENTS

2011/0267967 A1   11/2011   Ratasuk et al.
2012/0309403 A1   12/2012   Mekhail et al.
(Continued)

FOREIGN PATENT DOCUMENTS

CN    110752886 A    2/2020
EP    2 434 820 A1   3/2012
(Continued)

OTHER PUBLICATIONS

J. A. Fernandez-Segovia et al., A teletraffic model for the Physical Downlink Control Channel in LTE, Nov. 17, 2016, XP036249764.
(Continued)

*Primary Examiner* — Walter J Divito
(74) *Attorney, Agent, or Firm* — Jefferson IP Law, LLP

(57) ABSTRACT

A control resource allocation method, an apparatus, an electronic device, and at least one non-transitory computer readable storage medium are provided. The method includes identifying resource usage status information for the first period, and determining control resource set (CORESET) time-frequency resources and uplink/downlink (UL/DL) control channel element (CCE) patterns for the first period, based on the resource usage status information.

20 Claims, 20 Drawing Sheets

(51) Int. Cl.
*H04W 72/0453* (2023.01)
*H04W 72/20* (2023.01)

(56) References Cited

U.S. PATENT DOCUMENTS

2019/0081763 A1   3/2019  Akkarakaran et al.
2019/0274123 A1   9/2019  Cui et al.
2020/0236702 A1   7/2020  Nory et al.

FOREIGN PATENT DOCUMENTS

WO   2017/194707 A1   11/2017
WO   2019/047229 A1   3/2019
WO   2019/148057 A1   8/2019

OTHER PUBLICATIONS

Extended European Search Report dated Jul. 24, 2024, issue in European Patent Application No. 22788249.5.
CATT, PDCCH monitoring enhancements for up to 71GHz operation, R1-2102622, 3GPP TSG RAN WG1 #104b-e, Apr. 7, 2021, e-Meeting.
Sony, PDCCH enhancement for NR from 52.6GHz to 71GHz, R1-2103295, 3GPP TSG RAN WG1 #104-bis-e, Apr. 7, 2021, e-Meeting.
Intel Corporation, Discussion on PDCCH monitoring enhancements for extending NR up to 71GHz, R1-2103022, 3GPP TSG RAN WG1 Meeting #104b-e, Apr. 7, 2021, e-Meeting.
International Search Report dated May 26, 2022, issued in International Application No. PCT/KR2022/002534.

| Pattern | ratio (1/3) | ratio (1/2) | ratio (2/3) | ratio (1/1) | ratio (3/2) | ratio (2/1) | ratio (3/1) |
|---|---|---|---|---|---|---|---|
| $AL_{max}$ 2 | 2D-2U-4D | 2D-2U-2D | 2U-3D | 2U-2D | 3U-2D | 2U-2D-2U | 2U-2D-4U |
| $AL_{max}$ 4 | 4D-4U-8D | 4D-4U-4D | 4U-6D | 4U-4D | 6U-4D | 4U-4D-4U | 4U-4D-8U |
| $AL_{max}$ 8 | 8D-8U-16D | 8D-8U-8D | 8U-12D | 8U-8D | 12U-8D | 8U-8D-8U | 8U-8D-16U |
| $AL_{max}$ 16 | N/A | N/A | N/A | 16U-16D | N/A | N/A | N/A |

FIG.6B

CONTROL RESOURCE ALLOCATION METHOD, APPARATUS, ELECTRONIC DEVICE AND READABLE STORAGE MEDIUM

CROSS-REFERENCE TO RELATED APPLICATION(S)

This application is a continuation application, claiming priority under § 365(c), of an International application No. PCT/KR2022/002534, filed on Feb. 21, 2022, which is based on and claims the benefit of a Chinese patent application number 202110414197.3, filed on Apr. 16, 2021, in the Chinese Intellectual Property Office, the disclosure of which is incorporated by reference herein in its entirety.

TECHNICAL FIELD

The disclosure relates to the field of wireless communication technology. More particularly, the disclosure relates to a control resource allocation method and an electronic device.

BACKGROUND

In a 5$^{th}$ generation (5G) mobile networks system, physical downlink control channel (PDCCH) resources are determined through a control resource set (CORESET), which is a set of time-frequency domain resources configured by radio resource control (RRC) signaling.

In the related art, the CORESET resources (i.e., time-frequency domain resources) of a PDCCH are fixed and the PDCCH resources used for uplink (UL) authorization and downlink (DL) authorization are fixed.

However, in the 5G network, the terminals and services are more diversified, and the number of active users and the traffic in the network fluctuate over time, and accordingly the requirement for PDCCH resources also changes over time. Thereafter, the allocation of control resources in existing technologies cannot meet the requirement of 5G services. Therefore, a need exists for a new control resource allocation method.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a control resource allocation method, apparatus, electronic device and readable storage medium.

Additional aspects will be set forth in part in the description which follows and, in part, will be apparent from the description, or may be learned by practice of the presented embodiments.

In accordance with an aspect of the disclosure, a method for allocating control resources in an electronic device is provided. The method includes identifying resource usage status information for the first period, and determining control resource set (CORESET) time-frequency resources and UL/DL control channel element (CCE) patterns for the first period, based on the resource usage status information.

In accordance with another aspect of the disclosure, an electronic device is provided. The electronic device includes a memory in which a computer program is stored, and at least one processor for executing a computer program to implement to identify resource usage status information for a first period, and determine control resource set (CORESET) time-frequency resources and uplink (UL)/downlink (DL) control channel element (CCE) patterns for the first period, based on the resource usage status information.

In accordance with another aspect of the disclosure, a computer readable storage medium, a computer program stored on the computer readable storage medium are provided. The computer program is executed by the processor to implement the method provided in the first aspect embodiment or any embodiment of the first aspect.

Advantageous Effects

The technical solution provided by the disclosure brings the beneficial effect that it configures the control resources for the first period based on the resource usage status for the first period, realizes dynamic adjustment of the control resources, and may be applied to scenarios where the control resource requirement changes over time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings in which:

FIG. 6B is a predefined set of UL/DL CCE patterns according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

Figure 1A:
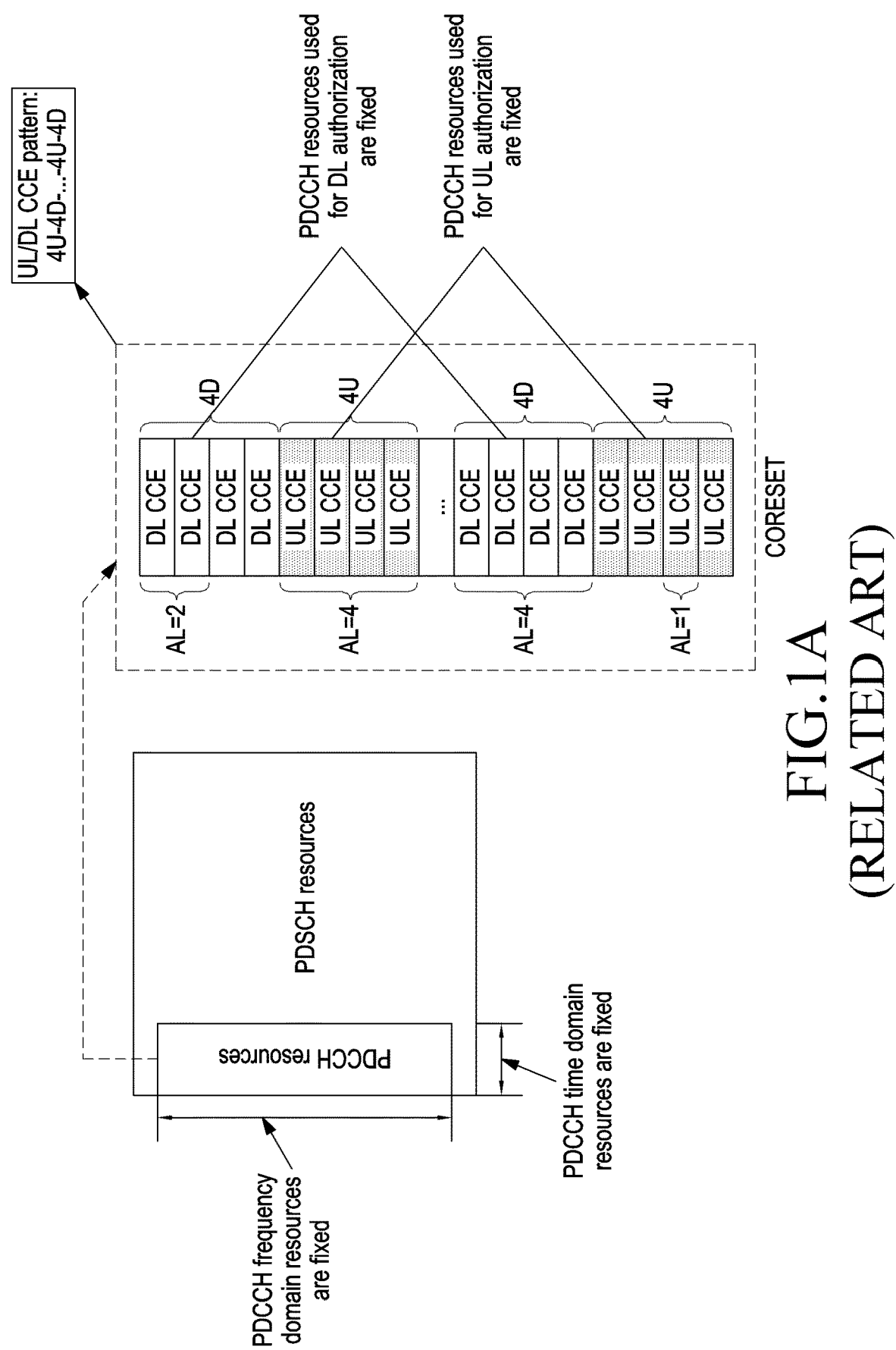
FIG. 1A is a schematic diagram of physical downlink control channel (PDCCH) resource allocation according to the related art.

FIG. 1A is a schematic diagram of physical downlink control channel (PDCCH) resource allocation according to the related art.

Referring to FIG. 1A, the time-frequency domain resources of the PDCCH in the related art are fixed, and the PDCCH resources for UL authorization and DL authorization are fixed. In FIG. 1A, AL is the aggregation level, UL is the uplink, and DL is the downlink.

Figure 1B:
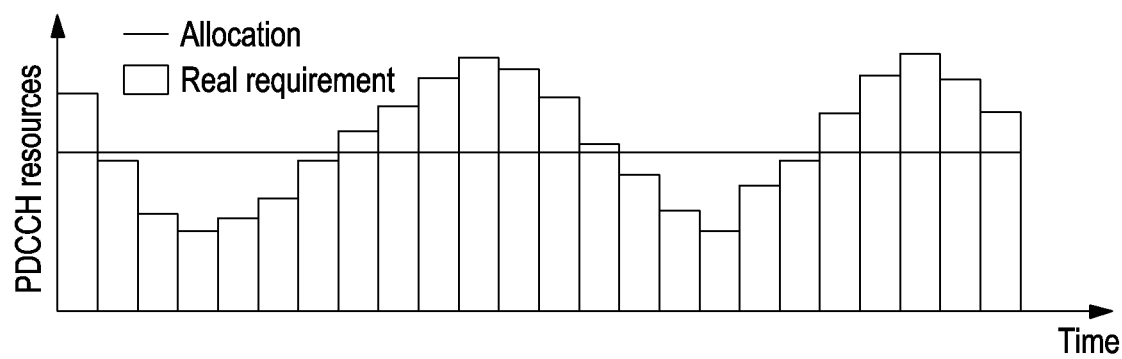
FIG. 1B is a schematic diagram illustrating a change of PDCCH resource requirement over time according to the related art.

FIG. 1B is a schematic diagram illustrating a change of PDCCH resource requirement over time according to the related art.

Referring to FIG. 1B, the PDCCH resources do not change with the number of active users in the network and the change of traffic. Compared with 4th generation (4G) networks, 5G networks are more flexible and have more diverse terminals and services. The number of active users and the traffic in the network fluctuate over time, and accordingly the requirement for PDCCH resources also changes over time. However, the allocated PDCCH resources are not adjusted over time and cannot dynamically match the requirement of 5G services.

Figure 2A:
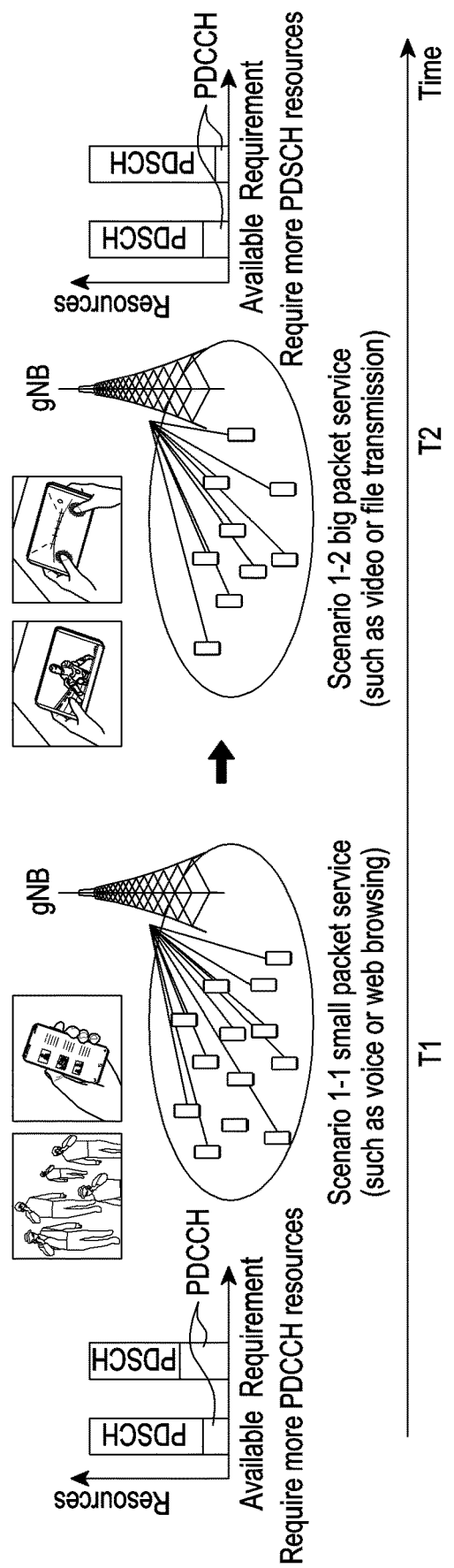
FIG. 2A is a schematic diagram of a scenario in which a fixed PDCCH resource allocation cannot meet a dynamic requirement of PDCCH resources and physical downlink shared channel (PDSCH) resources according to the related art.

FIG. 2A is a schematic diagram of a scenario in which a fixed PDCCH resource allocation cannot meet the dynamic requirement of PDCCH resources and physical downlink shared channel (PDSCH) resources according to the related art.

The fixed PDCCH resource planning cannot meet the dynamic requirement for PDCCH resources and PDSCH resources. Referring to FIG. 2A, when PDCCH resources are scarce but PDSCH resources are excessive (scenario 1-1), or when PDSCH resources are scarce but PDCCH resources are redundant (scenario 1-2), poor user experience (including intermittent voice calls, low download rate, bad web browsing/gaming/video experience, or the like) and poor wireless performance of the cell (including limited time-frequency domain resources not being fully utilized, low cell throughput, limited number of scheduled users, or the like) will occur due to increased latency. Meanwhile, the fixed UL/DL CCE pattern cannot meet the dynamic requirement for UL authorization and DL authorization.

Figure 2B:
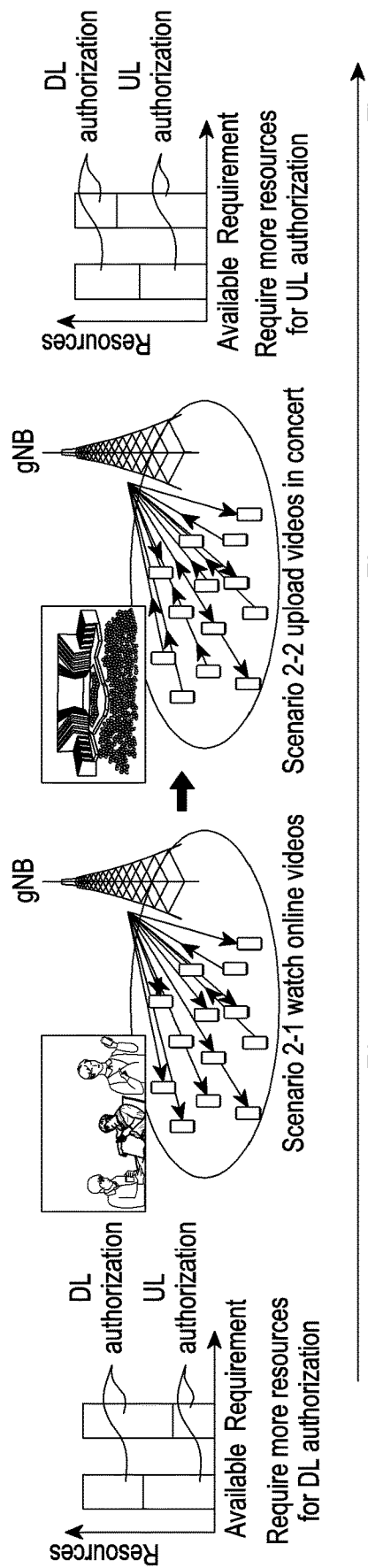
FIG. 2B is a schematic diagram of a scenario in which a fixed uplink/downlink (UL/DL) control channel element (CCE) pattern fails to meet a dynamic requirement for UL/DL authorization according to the related art.

FIG. 2B is a schematic diagram of a scenario in which a fixed uplink/downlink (UL/DL) control channel element (CCE) pattern fails to meet the dynamic requirement for UL/DL authorization according to the related art.

Referring to Scenario 2-1 in FIG. 2B, when the PDCCH resources for DL authorization are scarce but the PDCCH resources for UL authorization are redundant, poor user experience (including intermittent DL voice calls, low download rate, and non-smooth real-time video, or the like) and poor wireless performance of the cell (including low utilization rate of PDCCH resources for UL authorization, low number of scheduled DL users, or the like) will occur due to increased DL scheduling delay. In Scenario 2-2 shown in FIG. 2B below, when the PDCCH resources for UL authorization are scarce but the PDCCH resources for DL authorization are redundant, poor user experience (including poor UL voice call quality and low upload rate) and poor wireless performance of the cell (including low utilization rate of PDCCH resources for DL authorization and limited number of scheduled UL users) will occur due to increased UL scheduling delay. The next generation nodeB (gNB) in FIGS. 2A and 2B is a base station in the 5G system.

To address the above issues, the embodiment of this application provides a control resource allocation scheme, which will be described below.

Figure 3:
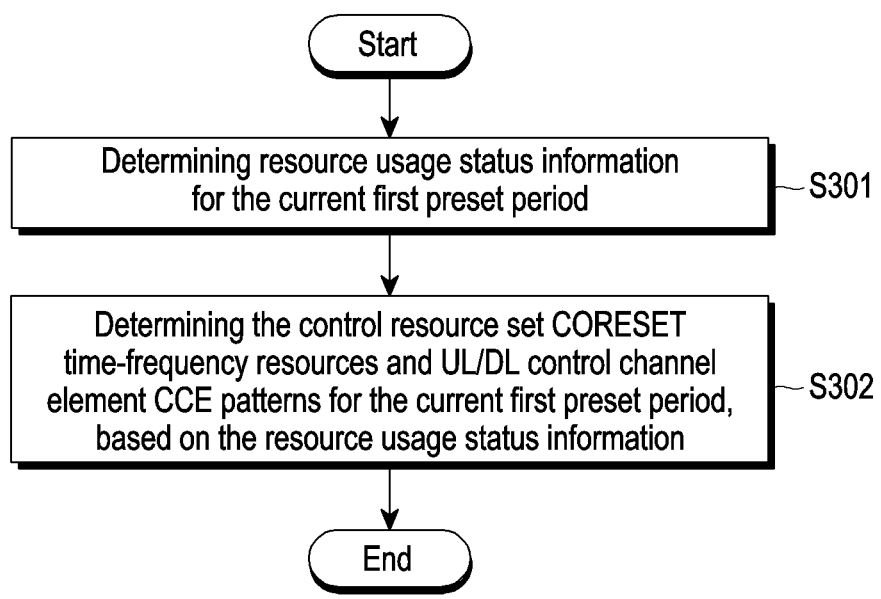
FIG. 3 is a schematic flowchart of a control resource allocation method according to an embodiment of the disclosure.

FIG. 3 is a schematic flowchart of a control resource allocation method according to an embodiment of the disclosure.

Referring to FIG. 3, operation S301, determining resource usage status information for the current first preset period.

Operation S302, determining the control resource set (CORESET) time-frequency resources and UL/DL control channel element (CCE) pattern for the current first preset period, based on the resource usage status information.

The embodiment of the disclosure allocate the control resources for the current first preset period based on the resource usage status for the current first preset period, realizes dynamic adjustment of the control resources, and may be applied to scenarios where the control resource requirement changes over time.

In an embodiment of the disclosure, the determining the resource usage status information for the current first preset period includes acquiring historical resource usage status information, and determining the resource usage status information for the current first preset period based on the historical resource usage status information.

The historical resource usage status information may be resource usage status information for any time period between the current first preset periods, or may be at least one resource usage status information for previous first preset period.

The resource usage status information includes at least the number of CCEs required for UL/DL, and may also include data resource utilization rate, or the like.

It should be noted that, for the convenience of describing the embodiments of the disclosure, the number of CCEs required for UL/DL and the data resource utilization rate of at least one first preset period are described as historical resource usage status information in the later embodiments of the disclosure, but the embodiments of the disclosure are not limited to this.

Thereafter, the control resource allocation method provided by the embodiments of the disclosure may include the following steps:

Step 1, acquiring the number of CCEs required for UL/DL and the data resource utilization rate for at least one previous first preset period, the previous first preset period being previous to the current first preset period.

In the real implementation of the scheme, the length of the first preset period may be set according to the real requirement, and the specific number of acquired periodic data for the previous first preset period (i.e., the number of CCEs required for UL/DL and the data resource utilization rate) may also be determined based on the real requirement.

Specifically, the acquired periodic data may include: the number of CCEs used by the base station for UL, the number of CCEs used by the base station for DL, the number of CCEs banned by the base station for UL, the number of CCEs banned by the base station for DL, the total number of CCEs available by the base station for UL in the current allocation, the total number of CCEs available by the base station for DL in the current allocation, the data resource utilization rate of the base station in the current allocation, or the like, and the number of CCEs required for UL/DL and the data resource utilization rate are computed based on these periodic data.

Step 2, based on the number of CCEs required for UL/DL for the previous first preset period and the data resource utilization rate, the number of CCEs required for UL/DL for the current first preset period and the data resource utilization rate are determined.

Specifically, the number of CCEs required for UL/DL and the data resource utilization rate for the current first preset period are predicted and determined based on the number of CCEs required for UL/DL and the data resource utilization rate of one or more previous first preset periods. It should be noted that the number of CCEs and the data resource utilization rate of UL/DL demands for the current first preset period may be predicted using traditional methods (e.g., linear filtering, infinite impulse response (IIR) filtering, or the like), or using AI-based models (e.g., supported vector regression (SVR) model, long short-term memory model (LSTM)).

Step 3, determining the CORESET time-frequency resources and the UL/DL CCE pattern for the current first preset period based on the number of CCEs required for UL/DL for the current first preset period and the data resource utilization rate.

Specifically, based on the predicted number of CCEs required for UL/DL, the CORESET time-frequency resources for the current first preset period are allocated in combination with information, such as data resource utilization rate, and the UL/DL CCE patterns for the current first preset period are allocated in combination with predefined UL/DL CCE patterns and supplementary UL/DL CCE patterns.

The method provided in this application determines the number of CCEs required for UL/DL for the current first preset period and the data resource utilization rate by the number of CCEs required for UL/DL for the previous first preset period and the data resource utilization rate, and allocates the CORESET time-frequency resources and the UL/DL CCE patterns for the current first preset period based on the number of CCEs required for UL/DL and the data resource utilization rate, the scheme allocates the control resources for the current first preset period based on the allocation of the control resources for the previous first preset period, realizes dynamic adjustment of the control resources, and may be applied to scenarios where the control resource requirement changes dynamically with time and service.

In an embodiment of the disclosure, the acquiring at least one number of CCEs required for UL/DL for previous first preset period includes acquiring the number of CCEs used for UL/DL, the number of CCEs banned for UL/DL, and the total number of CCEs available for UL/DL for the previous first preset period, and acquiring the number of CCEs required for UL/DL based on the number of CCEs used for UL/DL, the number of CCEs banned for UL/DL, and the total number of CCEs available for UL/DL.

Specifically, there is a large amount of statistical information in the base station from which statistics related to the previous first preset period need to be collected, which may include at least one of the following number of CCEs used by the base station for UL, number of CCEs used by the base station for DL; number of CCEs banned by the base station for UL, number of CCEs banned by the base station for DL, total number of CCEs available by the base station under the current allocation for UL, total number of CCEs available by the base station under the current allocation for DL, and data resource utilization rate of the base station.

The number of used CCEs is the real number of CCEs used by the base station for performing UL or DL scheduling behavior for the previous first preset period. The number of banned CCEs is the number of CCEs that are in shortage when the data resources are sufficient and the control resources are insufficient for the previous first preset period. Data resource utilization rate is the physical resource block (PRB) utilization rate of the DL service channel.

It is noted that the above statistics collection may be in the form of periodic and may be collected once every first preset period.

In an embodiment of the disclosure, the acquiring the number of CCEs required for UL/DL based on the number of CCEs used for UL/DL, the number of CCEs banned for UL/DL, and the total number of CCEs available for UL/DL includes acquiring a CCE utilization rate based on the number of CCEs used for UL/DL and the total number of CCEs available for UL/DL, and acquiring a ratio of banned CCEs based on the number of CCEs banned for UL/DL and the total number of CCEs available for UL/DL, determining an impact factor corresponding to the number of CCEs banned for UL/DL based on the ratio of banned CCEs, and acquiring the number of CCEs required for UL/DL, based on the CCE utilization rate, the number of CCEs used for UL/DL, the number of CCEs banned for UL/DL, and the impact factor.

Specifically, since the number of banned CCEs can truly reflect the shortage of system control resources only when the CCE utilization rate is relatively high, the solution of this application combines the CCE utilization rate and the impact factor of the number of banned CCEs to acquire a more accurate number of CCEs required for UL/DL, avoiding the problem that the computed number of required CCEs is higher than the real required number, improving the resource utilization rate, and thus increasing the system throughput.

Specifically, the determining an impact factor corresponding to the number of CCEs banned for UL/DL based on the ratio of banned CCEs includes:

First, for UL/DL, CCE utilization (CCEUsage) and banned CCE ratio (BannedCCERatio) are computed separately as follows:

CCEUsage=Number of used CCEs/totalavailable CCEs*100%

BannedCCERatio=Number of bannedCCEs/total availableCCEs*100%

Thereafter, the impact factor corresponding to the number of banned CCEs is defined as follows:

$\alpha$ factor (i.e., the first impact factor): applicable to a case with very high CCE utilization rate, e.g., CCE utilization rate>80%; and $\beta$ factor (i.e., the second impact factor): applicable to a case with relatively high CCE utilization rate, e.g., CCE utilization rate>60%.

Thereafter, the $\alpha$ and $\beta$ factors are updated according to the evolution of the banned CCE percentage in two consecutive first preset periods, with the following process:

$\Delta$BannedCCERatio="BannedCCERatio"($k$)−"BannedCCE"Ratio($k$−1)

if $\Delta$BannedCCERatio>offset_up, then:

$\alpha$=max(min($\alpha'+\Delta_\alpha \alpha_{max}$),$\alpha_{min}$)

$\beta$=max(min($\beta'+\Delta_\beta \beta_{max}$),$\beta_{min}$)

and if $\Delta$BannedCCERatio<-offset_down, then:

$\alpha$=max(min($\alpha'-\nabla_\alpha \alpha_{max}$),$\alpha_{min}$)

$\beta$=max(min($\beta'-\nabla_\beta \beta_{max}$),$\beta_{min}$)

Otherwise, the $\alpha$ impact factor and $\beta$ impact factor are not adjusted.

Wherein, $\Delta\alpha$ and $\Delta\beta$ are the adjustment steps of the $\alpha$ impact factor and $\beta$ impact factor, respectively, ($\alpha$min, $\alpha$max) is the adjustment range of the $\alpha$ impact factor, ($\beta$min, $\beta$max) is the adjustment range of the $\beta$ impact factor, $\alpha'$ and $\beta'$ are the $\alpha$ impact factor and $\beta$ impact factor for the previous first preset period, respectively, and initial values of $\alpha'$ and $\beta'$ may be given for the initial first preset period.

It should be noted that the initial values of the above parameters, offset_up, offset_down, ($\alpha$min, $\alpha$max), ($\beta$min, $\beta$max), $\alpha'$ and $\beta'$ may be set according to real needs. By way of example, [offset_up, offset_down=[0.5, 0.5], [$\alpha$min, $\alpha$max, $\Delta\alpha$, $\nabla\alpha$]=[0.4, 1.0, 0.1, 0.1], [$\beta$min, $\beta$max, $\nabla\beta$, $\nabla\beta$]=[0.0, 0.6, 0.1, 0.1].

In an embodiment of the disclosure, the impact factor includes the first impact factor and the second impact factor, the acquiring of the number of CCEs required for UL/DL, the number of CCEs used for UL/DL, the number of CCEs banned for UL/DL, and the impact factor based on the CCE utilization rate includes, determining the number of CCEs required for UL/DL based on the number of CCEs used for UL/DL, the number of CCEs banned for UL/DL, and the first impact factor, if the CCE utilization rate is not less than the first preset value, determining the number of CCEs required for UL/DL based on the number of CCEs used for UL/DL, the number of CCEs banned for UL/DL, and the second impact factor, if the CCE utilization rate is less than the first preset value and not less than the second preset value, and taking the number of CCEs used for UL/DL as the number of CCEs required for UL/DL, if the CCE utilization rate is less than the second preset value.

Specifically, for UL/DL, the number of CCEs used, the number of CCEs banned, and their impact factors are combined to compute the number of required CCEs.

If CCEUsage>Threshold_High (the first preset value, e.g., 80%), i.e., when CCE usage is very high, the number of banned CCEs is considered to reflect the shortage of control resources, when the $\alpha$ impact factor is used to compute the following:

Number of required CCEs=Number of used CCEs+$\alpha \times$Number of banned CCEs And if Threshold_High>CCEUsage>Threshold_Medium (the second preset value, e.g., 60%), i.e., when the CCE utilization rate is relatively high, the number of banned CCEs is considered to reflect the shortage of control resources to a certain extent, using the $\beta$ impact factor computed as follows:

Number of required CCEs=Number of used CCEs+$\beta \times$Number of banned CCEs

In addition, when CCE utilization rate is relatively low (i.e., Threshold_Medium>CCEUsage), the number of banned CCEs is considered to not faithfully reflect the degree of control resource shortage, and the following operation is performed:

Number of required CCEs=Number of used CCEs.

In an embodiment of the disclosure, the determining of the resource utilization status information for the current first preset period based on the historical resource utilization status information includes: using a prediction model to predict the resource usage status information for the current first preset period based on the historical resource usage status information.

Further, if the number of required CCEs for UL/DL and the data resource utilization rate for the previous first preset period are used as the historical resource usage status information, the determining of the number of required CCEs for UL/DL and the data resource utilization rate for the current first preset period based on the number of CCEs required for UL/DL and the data resource utilization rate for the previous first preset period includes: inputting the number of CCEs required for UL/DL and the data resource utilization rate for the previous first preset period into the preset artificial intelligence prediction model, and outputting the number of CCEs required for UL/DL and the data resource utilization rate for the current first preset period.

Figure 4A:
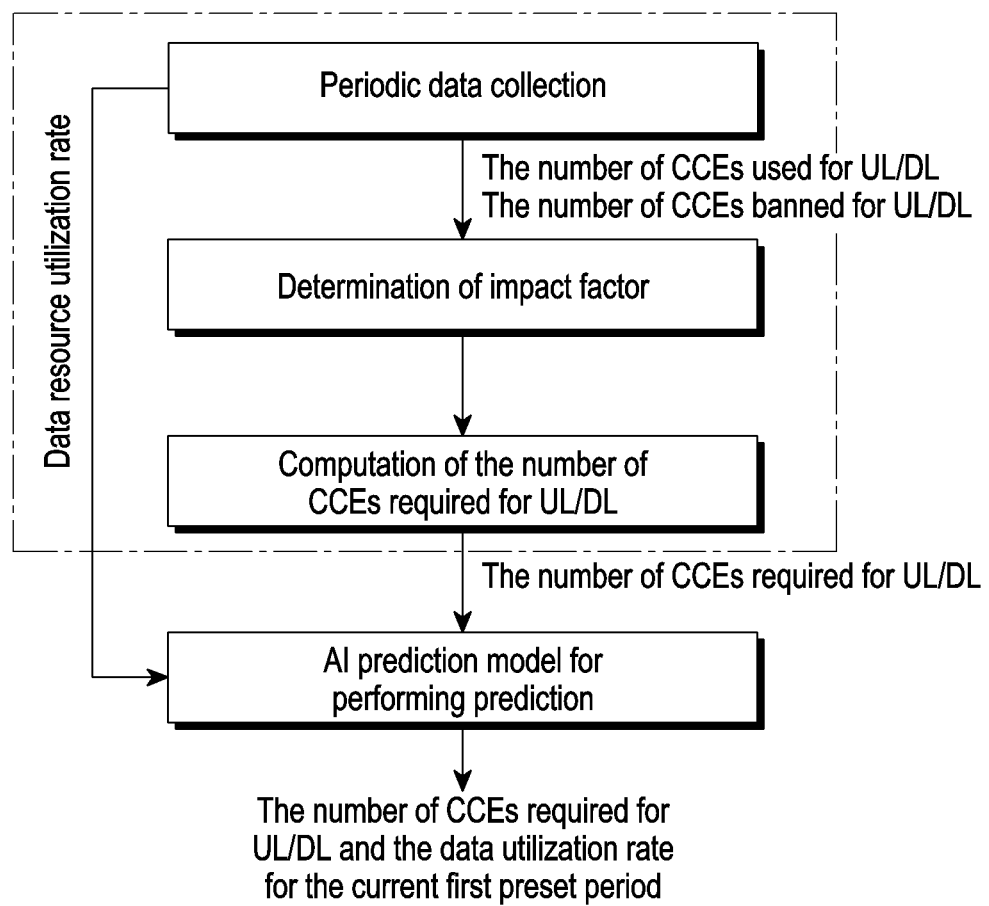
FIG. 4A is a schematic flowchart of periodic data acquisition and artificial intelligence (AI) prediction according to an embodiment of the disclosure.

FIG. 4A is a schematic flowchart of periodic data acquisition and AI prediction according to an embodiment of the disclosure.

Specifically, an embodiment of the disclosure may use the preset artificial intelligence prediction model to predict the current first preset period, referring to FIG. 4A, where the input is the number of CCEs required for UL/DL and the data resource utilization rate for the previous first preset period, and the output is the number of CCEs required for UL/DL and the data resource utilization rate for the current first preset period. The input may be the number of CCEs required for UL/DL and the data resource utilization rate for the plurality of previous first preset periods. Therein, the data resource utilization rate for the online first preset period, as well as the number of CCEs used for UL/DL and the number of CCEs banned for UL/DL can be obtained through periodic data collection, and an impact factor is determined based on the number of CCEs used for UL/DL and the number of CCEs banned for UL/DL, and the number of CCEs required for UL/DL is computed based on the impact factor.

For example, assuming that the predicted value of the current first preset period is $x_0$, which is predicted by the input value $\{x_{-M}, x_{-(M-1)}, \ldots x_{-1}\}$ for M previous first preset periods.

Figure 4B:
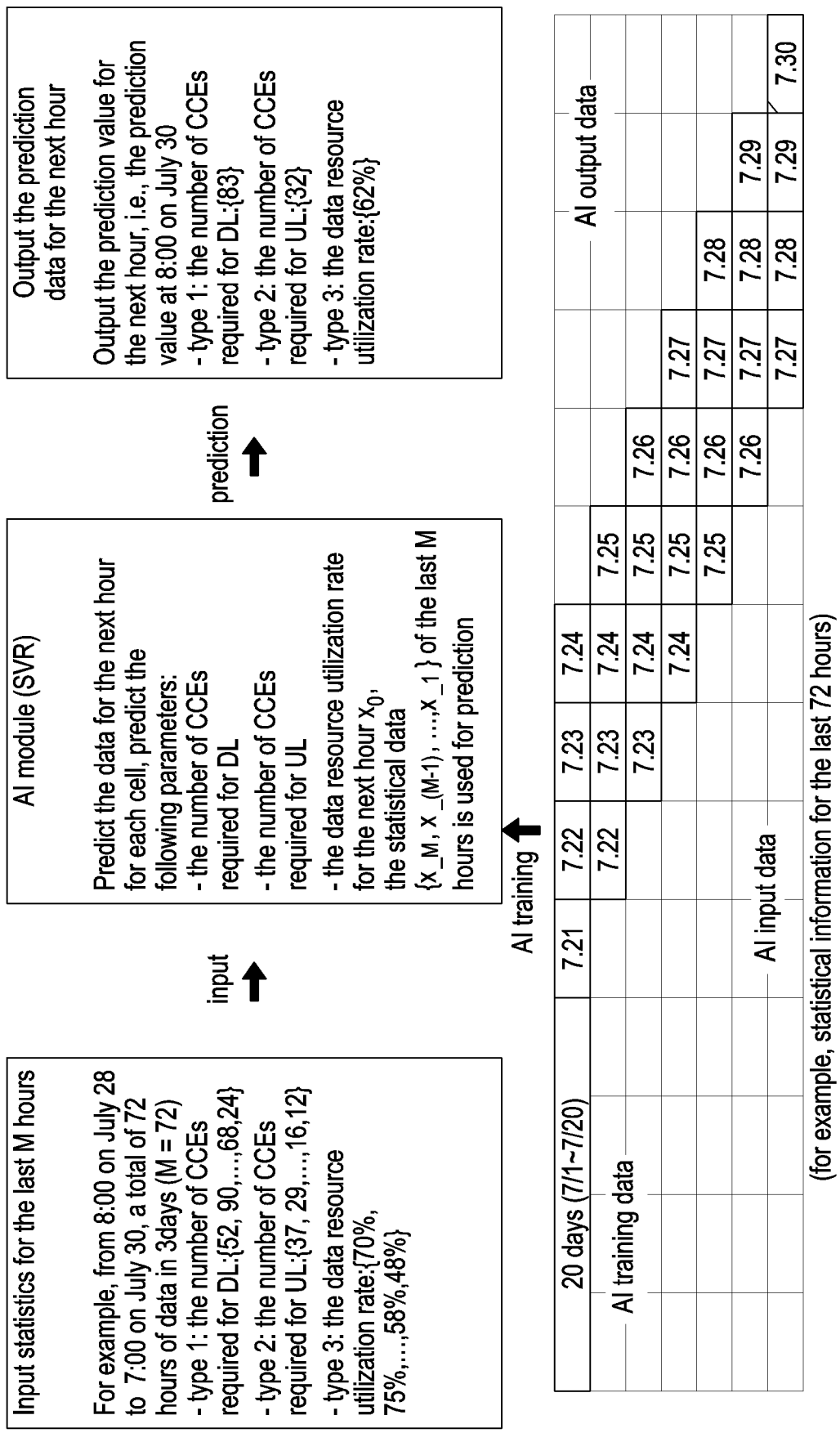
FIG. 4B is a schematic flowchart of AI prediction according to an embodiment of the disclosure.

FIG. 4B is a schematic flowchart of AI prediction according to an embodiment of the disclosure.

Referring to FIG. 4B, for example, to predict the predicted value for the current first preset period starting at 8:00 on July 30, the data of the previous 3 days (starting from 8:00 on July 28 to 7:00 on July 30) may be inputted, then the total M=(3*24=72) data. The data contains two types, type 1 is the number of CCEs required for UL/DL (corresponding to the first and second types in the figure), and type 2 is the data resource utilization rate. Thereafter, the AI model (e.g., SVR model) is trained and predicted to acquire the predicted value (including the number of CCEs required for UL/DL and the data resource utilization rate) for the current first preset period.

The above AI model is trained (corresponding to AI training in the figure), and AI training data is obtained, e.g., the AI model is trained by using the statistical data from July 1 to July 20 (20 days), and the trained AI model is used to predict the number of CCEs required for UL/DL and the data resource utilization rate for the current first preset period in the above way.

In an embodiment of the disclosure, the determining of the CORESET time-frequency resources and an UL/DL CCE patterns for the current first preset period, based on the resource usage status information includes determining the CORESET time-frequency resources for the current first preset period, based on the resource usage status information, and determining the UL/DL CCE patterns for the current first preset period, based on the CORESET time-frequency resources.

Further, if the number of CCEs required for UL/DL and the data resource utilization rate for the previous first preset period are used as the historical resource usage status information, determining of the CORESET time-frequency resources and the UL/DL CCE patterns for the current first preset period based on the number of CCEs required for UL/DL and the data resource utilization rate for the current first preset period includes determining CORESET time domain resources for the current first preset period based on the number of CCEs required for UL/DL and the data resource utilization rate, determining CORESET frequency domain resources for the current first preset period based on the number of CCEs required for UL/DL and the CORESET time domain resources, and determining the UL/DL CCE patterns for the current first preset period based on the number of CCEs required for UL/DL and the CORESET time-frequency resources.

It is noted that if only the number of CCEs required for UL/DL may be acquired, the CORESET time-domain resources for the current first preset period may also be determined based on the number of CCEs required for UL/DL only. Specifically, the required CORESET time domain resources for the current first preset period is computed using the number of CCEs required for UL/DL, at which point the impact of the data resource utilization rate is not considered and the computed CORESET time domain resources are directly used as the CORESET time domain resources for the current first preset period. Of course, the impact of the data resource utilization rate may also be considered, and the scheme for determining the CORESET time domain resources for the current first preset period based on the number of CCEs required for UL/DL and the data resource utilization rate will be described below.

Specifically, in an embodiment of the disclosure, at first, the CORESET time domain resources for the current first preset period are determined based on the number of CCEs required for UL/DL and the data resource utilization rate, and the CORESET frequency domain resources for the current first preset period are determined based on the number of CCEs required for UL/DL and the determined CORESET time domain resources, i.e., the CORESET time-frequency domain resources for the current first preset period are determined. Finally, based on the number of CCEs required for UL/DL and CORESET time-frequency resources, the UL/DL CCE patterns for the current first preset period are determined, and the control resources for the current first preset period are thus determined.

In an embodiment of the disclosure, the determining of the CORESET time domain resources for the current first preset period based on the required CORESET time domain resources and the data resource utilization rate includes acquiring the required CORESET time domain resources based on the number of CCEs required for UL/DL, taking the CORESET time domain resources for the previous first preset period as the CORESET time domain resources for the current first preset period, if the required CORESET time domain resources are not less than the historical CORESET time domain resources and the data resource utilization rate is not less than the third preset value, taking the historical CORESET time domain resources as the CORESET time domain resources for the current first preset period, if the required CORESET time domain resources are not greater than the historical CORESET time domain resources and the data resource utilization rate is not greater than the fourth preset value, and determining the required CORESET time domain resources as the CORESET time domain resources for the current first preset period, if the above conditions are not met.

The historical CORESET time domain resources may include the CORESET time domain resources for the previous first preset period, and the CORESET time domain resources for the previous first preset period will be described below as the historical CORESET time domain resources, but the disclosure is not limited to this.

In order to avoid the following problems, problem one, the required CORESET time domain resources are increased compared to the previous first preset period, and at this time, if the data resources are highly utilized, it indicates that there are currently no free resources available to change from data resources to control resources to meet the increased requirement of CORESET resources, in this case directly increasing CORESET resources will instead lead to the decrease of system throughput, problem two, when the required CORESET time domain resources are reduced compared to the previous first preset period, and if the data resource utilization rate is low at this time, it indicates that there is no need to increase the data resources by reducing the CORESET resources, which will lead to the unnecessary CORESET resource adjustment and signaling overhead, problem three, when the required CORESET time domain resources are not changed compared to the previous first preset period, if the required CORESET frequency domain resources do not change much, it will also lead to the unnecessary CORESET resource adjustment and signaling overhead. In an embodiment of the disclosure, while determining CORESET resources based on the predicted number CCEs required for UL/DL, the data resource utilization rate and the change amount in the required CORESET frequency domain resources are also taken into account. On the one hand, a tight mutual coordination between control and data resources is obtained to effectively improve the system throughput, while unnecessary CORESET resource adjustment and signaling overhead are avoided. Specifically, the first two problem above are addressed by considering the data resource utilization rate, and the third problem above is addressed by considering the change amount of the required CORESET frequency domain resources.

Specifically, the determining of the CORESET time domain resources for the current first preset period in this application may include:

(1) based on the predicted number of CCEs required for UL/DL, the required CORESET time domain resources may be computed as follows:

$$required time\text{-}domain = \min\left(\text{ceil}\left(\frac{N_1 + N_2}{N\_cce\_per\_symbol}\right), MaxSymbol\right)$$

where ceil(X) denotes the upward rounding of the value X in parentheses, and required time-domain is the number of required CORESET time-domain resources;

N1 is the number of CCEs required for UL;

N2 is the number of CCEs required for DL;

N_cce_per_symbol is the number of CCEs included in one symbol length under the current bandwidth configuration (system configuration); and MaxSymbol is the maximum number of time domain symbols available for PDCCH in the system (system configuration).

(2) when the required CORESET time domain resources increase compared to the previous first preset period, but at this time if the data resource utilization rate is above a certain threshold (i.e., the third preset value), the current first preset period does not need to adjust the CORESET time domain resources, that is:

if((required time-domain>last time-domain) and (PU>THH))

target time-domain=last time-domain where last time-domain is the number of CORESET time-domain resources for the previous first preset period;

PU is the data resource utilization rate;

THH is the high threshold for data resource utilization rate (i.e., the third preset value), above which the data resource utilization rate is considered high, for example, the reference value for this threshold can be 80%; and target time-domain is the final CORESET time domain resources applicable to the current first preset period.

When the required CORESET time-domain resources are reduced compared to the previous first preset period, and at this time if the data resource utilization rate is below a certain threshold (i.e., the fourth preset value), the CORESET time-domain resources do not need to be decreased for the current first preset period, that is:

if((required time-domain<last time-domain) and (PU<THM))

target time-domain=last time-domain where, THM is the low threshold for data resource utilization rate (i.e., the fourth preset value), below which the data resource utilization rate is considered low, and the reference value of this threshold may be 50%.

Excluding the above two cases, the required CORESET time domain resources are used as the final CORESET time domain resources applicable to the current first preset period.

In an embodiment of the disclosure, the determining of the CORESET frequency domain resources for the current first preset period based on the number of CCEs required for UL/DL for the current first preset period and the CORESET time domain resources includes acquiring required CORESET frequency domain resources and required CORESET time domain resources based on the number of CCEs required for UL/DL and the historical CORESET time domain resources, and determining the CORESET frequency domain resources for the current first preset period, based on the required CORESET frequency domain resources and the required CORESET time domain resources.

Further, the determining the CORESET frequency domain resources for the current first preset period based on the required CORESET frequency domain resources and the required CORESET time domain resources includes: determining the historical CORESET frequency domain resources as the CORESET frequency domain resources for the current first preset period, if the CORESET time domain resources are the same as the historical CORESET time domain resources and the change amount of the required CORESET frequency domain resources is not greater than the fifth preset value compared to the historical CORESET frequency domain resources, and determining the required CORESET frequency domain resources as the CORESET frequency domain resources for the current first preset period, if the above conditions are not met.

The historical CORESET frequency domain resources may include the CORESET frequency domain resources for the previous first preset period, and the CORESET frequency domain resources for the previous first preset period will be described below as the historical CORESET frequency domain resources, but the scheme of this application is not limited to this.

Specifically, the determining of the CORESET frequency domain resources for the current first preset period may include:

(1) computing the required CORESET frequency-domain resources with the following formula:

$$required frequency\text{-}domain = \text{ceil}\left(\frac{N_1 + N_2}{target\ time\text{-}domain}\right)$$

where the required frequency-domain is the required CORESET frequency-domain resources.

(2) determining the final CORESET frequency domain resources applicable to the current first preset period.

First, the change amount of the required CORESET frequency-domain resources (i.e., the change amount of the required frequency-domain resources for the current first preset period compared to the frequency-domain resources for the previous first preset period) needs to be computed as follows:

$$F_{gap} = \frac{|requiredFD - \text{last } utilizedFD|}{\text{last } utilizedFD}$$

Where Fgap is the change amount of the required CORESET frequency domain resources in %, which represents the degree of change in the frequency domain resources (percentage increase or decrease), if the value is less than a certain threshold (i.e., the fifth preset value) and the time domain resources are the same as the previous first preset period, then there is no need to modify the CORESET to reduce the signaling overhead.

Where required FD is the required CORESET frequency domain resources.

Where last utilized FD is the CORESET frequency domain resources for the previous first preset period.

If the required CORESET time-domain resource is equal to that of the previous first preset period and the change amount of the required CORESET frequency-domain resources for the two long periods before and after is less than the threshold (i.e., the change amount of the required CORESET time-frequency-domain source with respect to that of the previous first preset period is not greater than the fifth preset value), then the CORESET frequency-domain resources does not need to be adjusted for the current first preset period, that is:

if((target time-domain=last time-domain) and (Fgap<THgap))

target frequency-domain=last utilizedFD

Where target frequency-domain is the final CORESET frequency domain resources applicable to the current first preset period, and THgap is the fifth preset value.

Excluding the above, the required CORESET frequency-domain resources is used this time as the final CORESET frequency-domain resources applicable to the current first preset period.

After determining the final CORESET time domain resources and the final CORESET frequency domain resources for the current first preset period, i.e., the final CORESET time-frequency resource is determined, the final CORESET time-frequency resource reallocation trigger judgment is performed, specifically, if the determined final CORESET time domain resources applicable to the current first preset period or the final CORESET frequency domain resources has changed from the previous first preset period, then the radio resource control (RRC) signaling is triggered for CORESET resource allocation. The above process of determining CORESET time-frequency resources may be shown in FIG. 5.

Figure 5:
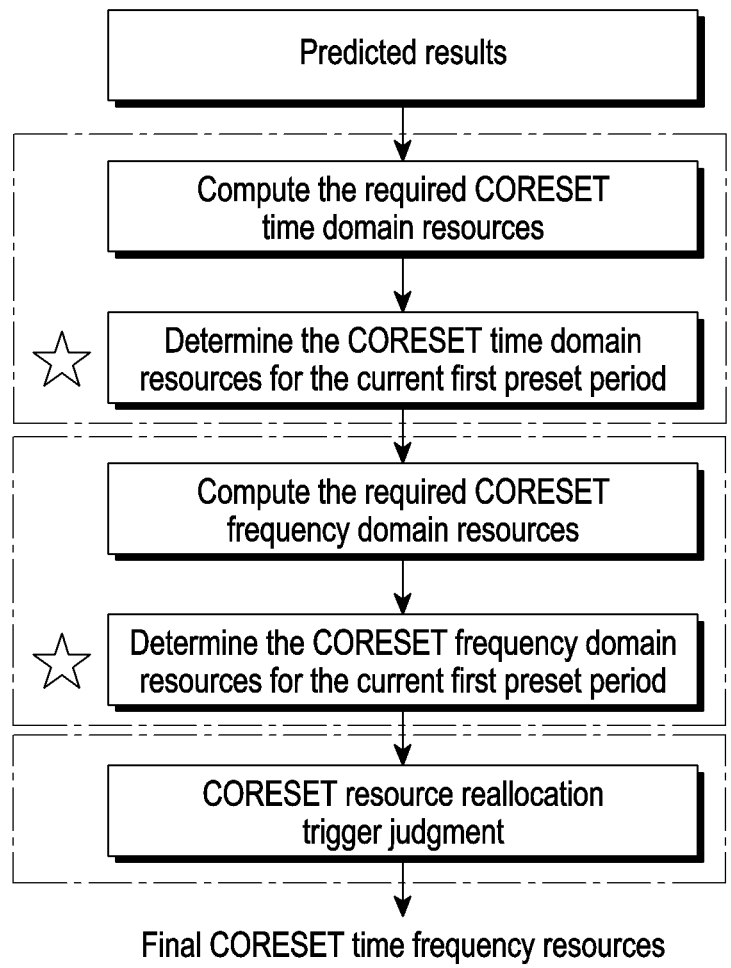
FIG. 5 is a schematic flowchart of determining a CORESET time-frequency resource for a current first preset period based on a number of CCEs required for UL/DL according to an embodiment of the disclosure.

FIG. 5 is a schematic flowchart of determining a CORESET time-frequency resource for a current first preset period based on a number of CCEs required for UL/DL according to an embodiment of the disclosure.

Referring to FIG. 5, according to the prediction result of AI model, the required CORESET time domain resources are computed, the current CORESET time domain resources of the first preset period is determined according to the required CORESET time domain resources, the required CORESET frequency domain resources are computed, the CORESET frequency domain resources for the current first preset period is determined, and the CORESET resource reallocation trigger judgment is performed to get final CORESET time-frequency domain resources.

In an embodiment of the disclosure, the determining of the UL/DL CCE patterns for the current first preset period based on the number CCEs required for UL/DL and the CORESET time-frequency resources for the first period includes acquiring a ratio of CCEs required for UL/DL based on the number of CCEs required for UL/DL for the current first preset period, and determining the UL/DL CCE patterns for the current first preset period based on the ratio of CCEs required for UL/DL and the CORESET time-frequency resources.

Further, the acquiring of the UL/DL CCE patterns for the current first preset period based on the ratio of CCEs required for UL/DL and the CORESET time-frequency resources includes determining the total number of CCEs available for UL/DL based on the CORESET time-frequency resources, determining the UL/DL CCE patterns for the current first preset period based on ratio of CCEs required for UL/DL, predefined set of UL/DL CCE ratios, predefined set of UL/DL CCE patterns, and the total number of CCEs available for UL/DL, if the ratio of CCEs required for UL/DL falls within a predefined range of UL/DL CCE ratios, and determining the UL/DL CCE patterns for the current first preset period based on the ratio of CCEs required for UL/DL and the total number of CCEs available for UL/DL, if the ratio of CCEs required for UL/DL does not fall within the predefined UL/DL CCE ratio.

Specifically, in this embodiment of the disclosure, all the ratios of CCEs required for UL/DL are matched by means of a predefined set of UL/DL CCE patterns and dynamically generated supplementary UL/DL CCE patterns to meet the diversity requirements for control resources. Specifically, the predefined set of UL/DL CCE patterns may cover most of the UL/DL control resource requirement ratios for 5G.

Figure 6A:
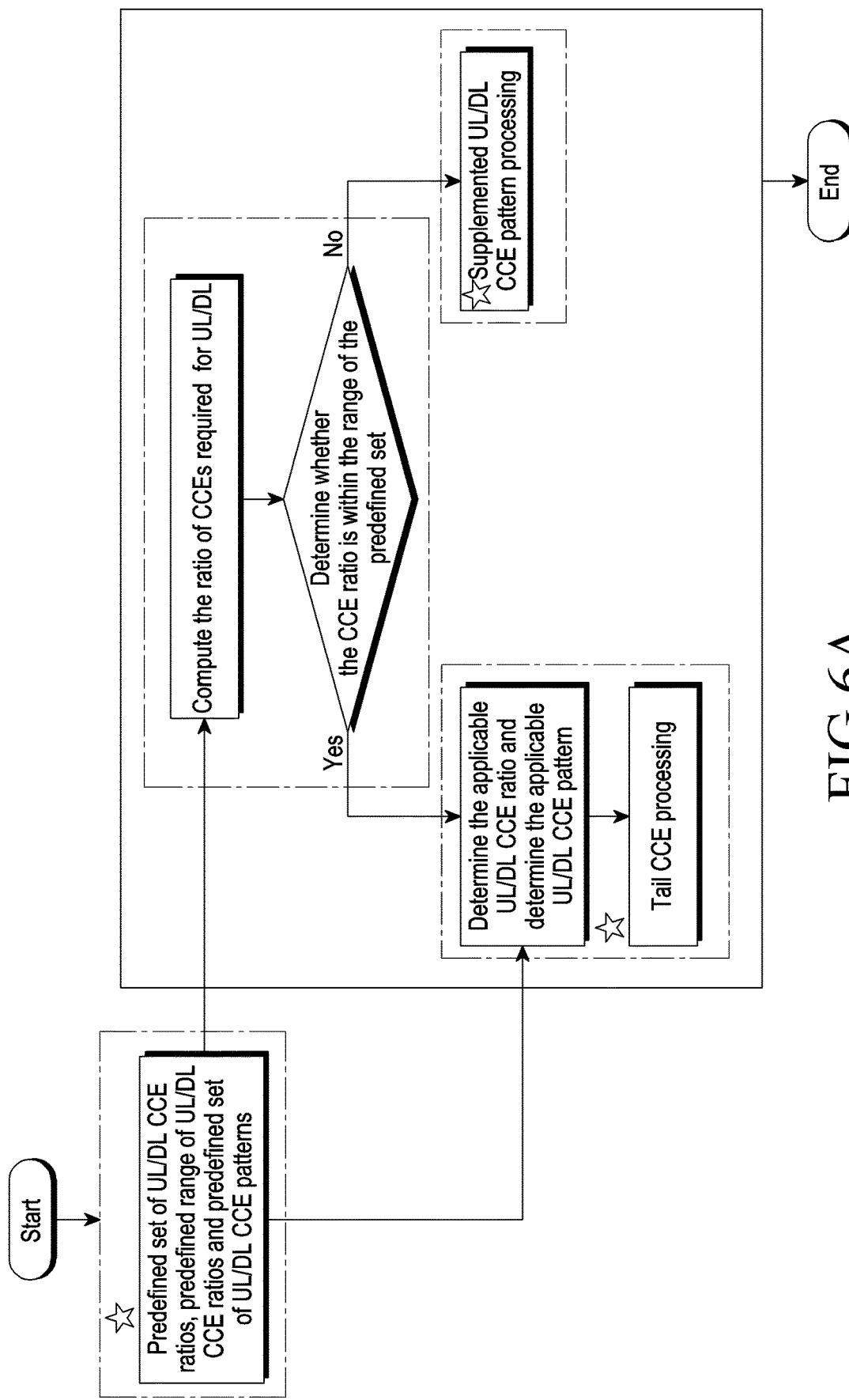
FIG. 6A is a schematic flowchart of determining a UL/DL CCE pattern for a current first preset period based on a number of CCEs required for UL/DL according to an embodiment of disclosure.

FIG. 6A is a schematic flowchart of determining a UL/DL CCE pattern for the current first preset period based on the number of CCEs required for UL/DL according to an embodiment of disclosure.

Referring to FIG. 6A, for the CCE ratios required for UL/DL within the predefined ratio set, the predefined UL/DL CCE patterns plus the tail CCE pattern processing may be used to determine the UL/DL CCE patterns applicable to the current first preset period; and for the CCE ratios required for UL/DL beyond the predefined ratio set, the dynamic generation of supplementary patterns may be used to the UL/DL CCE patterns applicable to the current first preset period.

First, an embodiment of the disclosure designs an UL/DL CCE ratio range, a predefined set of UL/DL CCE ratios, and a predefined set of UL/DL CCE patterns. The design guidelines and design process of the above three are described below. It is understood that the UL/DL CCE ratio range, the predefined set of UL/DL CCE ratios, and the predefined set of UL/DL CCE patterns are stored in the system in the form of a table once the design is completed and used in the system execution process later. The above setup process may include:

(1) determining the predefined set of UL/DL CCE ratios

The predefined set of UL/DL CCE ratios should cover most of the UL/DL control resource requirements of 5G, for example, the predefined set of UL/DL CCE ratios may be {1/3, 1/2, 2/3, 1/1, 3/2, 2/1, 3/1}.

(2) determining the predefined set of UL/DL CCE patterns

First, the number of UL/DL CCEs in the predefined set of UL/DL CCE patterns is computed based on the predefined set of UL/DL CCE ratios and the maximum CCE aggregation level (ALmax). For different UL/DL CCE ratios, the minimum allocation length (i.e., CCE pattern unit) of a section of contiguous UL or DL resources are determined by ALmax(for ensuring cell coverage), so for each CCE aggregation level, different predefined CCE pattern sets need to be designed separately.

When the predefined UL/DL CCE ratio is less than or equal to 1, the number of UL CCEs in the CCE pattern is the minimum continuously allocated resource length and is determined by ALmax, that is, the number of UL CCEs=the maximum CCE aggregation level, and the number of DL CCEs=the number of UL CCEs/the ratio of UL/DL CCEs.

Conversely, when the predefined UL/DL CCE ratio is greater than 1, the number of DL CCEs of the CCE pattern is the minimum continuously allocated resource length and is determined by ALmax, that is, the number of DL CCEs=the maximum CCE aggregation level, and the number of UL CCEs=the number of DL CCEs*the ratio of UL/DL CCEs.

Second, if the number of DL CCEs determined above is greater than twice ALmax, in order to avoid the failure of CCE allocation due to the mismatch between the CCE location and the UE cell-radio network temporary identifier (C-RNTI), the DL CCEs can be divided into two parts, one part is equal to ALmax in length, and the other part is equal to the total number of DL CCEs minus ALmax in length.

Similarly, if the number of UL CCEs determined above is greater than twice ALmax, the UL CCEs may be divided into two parts, one part is equal to ALmax in length, and the other part is equal to the total number of UL CCEs minus ALmax in length.

Following the above example, the predefined set of UL/DL CCE images corresponding to the above predefined set {1/3, 1/2, 2/3, 1/1, 3/2, 2/1, 3/1} of UL/DL CCE ratios obtained according to the above design method is shown in FIG. 6B.

FIG. 6B is a predefined set of UL/DL CCE patterns according to an embodiment of the disclosure.

Referring to FIG. 6B, the corresponding UL/DL CCE pattern units may be found from table based on a set of UL/DL CCE ratios and ALmax. For example, the UL/DL CCE pattern unit corresponding to ratios 1 (1/3) and ALmax2 are 2D-2U-4D, i.e., in this UL/DL CCE pattern unit: 2 CCEs are reserved for DL grant-2 CCEs are reserved for UL grant-4 CCEs are reserved for DL grant. In the subsequent determination of the UL/DL CCE patterns, the UL/DL CCE pattern unit may be cyclically arranged several times under the total number of CCEs available for UL/DL, and the tail processing, or the like, to acquire the final UL/DL CCE pattern. In addition, "N/A" in the table shown in FIG. 6B indicates that there is no corresponding UL/DL CCE pattern unit.

(3) determining the predefined UL/DL CCE ratio range

Taking the predefined set of UL/DL CCE ratios shown in FIG. 6B as an example, since the predefined set of UL/DL CCE ratios cannot cover all the UL/DL CCE ratio ranges, when the CCE ratio required for UL/DL is smaller than the ratio 1 (1/3) in the predefined set of UL/DL CCE ratios and larger than the ratio 7 (3/1) in the predefined set of UL/DL CCE ratios, if the CCE pattern corresponding to ratio 1 (1/3) in the predefined set of CCE ratios or ratio 7 (3/1) in the predefined set of UL/DL CCE ratios are still be used, it will result in the allocation of the UL/DL ratios not being precise enough.

Therefore, the embodiment of the disclosure sets a range of UL/DL CCE ratios, and when the CCE ratios required for UL/DL are within the set range of ratios, a predefined UL/DL CCE pattern plus tail CCE pattern processing can be used to determine the UL/DL CCE patterns applicable to the current first preset period, and for the required CCE ratios beyond the set range, the dynamic generation of supplementary patterns can be used to the UL/DL CCE patterns applicable to the current first preset period.

In this case, the predefined UL/DL CCE ratio range taking into account the range deviation may be:

[1/3*(1−range deviation), 3*(1+range deviation)]

Where the reference value of range deviation may be 15%.

Thereafter, the CCE ratio for UL/DL requirements is computed as follows:

$$UL{:}DL \text{ required } CCE \text{ ratio } (r) = \frac{N_1 X}{(N_1 + N_2)Y - N_1 X}$$

Where UL:DL required CCE ratio (i.e., r) is the CCE ratio required for UL/DL;

N1 is the number of CCEs required for UL;

N2 is the number of CCEs required for DL;

X is the number of time slots available for transmitting DL grant within 10 time slots; and Y is the number of time slots available for transmitting UL grant within 10 time slots.

The following is a detailed description of the process of determining the UL/DL CCE patterns for the current first preset period, which is divided into two ways based on whether the CCE ratio required for UL/DL falls within the predefined UL/DL CCE ratio or not.

One, determining the UL/DL CCE patterns for the current first preset period based on ratio of CCEs required for UL/DL, predefined set of UL/DL CCE ratios, predefined set of UL/DL CCE patterns, and the total number of CCEs available for UL/DL, if the ratio of CCEs required for UL/DL falls within a predefined range of UL/DL CCE ratios, including determining a maximum CCE aggregation level for the current first preset period, selecting a corresponding UL/DL CCE pattern unit from the predefined sets of UL/DL CCE patterns based on the CCE ratios required for UL/DL and the maximum CCE aggregation level, and determining the UL/DL CCE patterns for the current first predefined period based on the UL/DL CCE pattern unit and the total number of CCEs available for UL/DL.

Further, the determining of the UL/DL CCE patterns for the current first preset period based on the UL/DL CCE pattern unit and the total number of CCEs available for UL/DL includes determining the UL/DL CCE patterns for the current first preset period based on the UL/DL CCE pattern unit, if a length corresponding to the total number of CCEs available for UL/DL is an integer multiple of the length of the UL/DL CCE pattern unit, and acquiring an UL/DL tail CCE pattern based on the ratio of CCEs required for UL/DL and the total number of CCEs available for UL/DL, and determining the UL/DL CCE patterns for the current first preset period, based on the UL/DL CCE pattern unit and the UL/DL tail CCE pattern, if the length corresponding to the total number of CCEs available for UL/DL is not an integer multiple of the length of the UL/DL CCE pattern unit.

Specifically, the determining of the UL/DL CCE patterns for the current first preset period may include (1) determining an UL/DL CCE ratio, and an UL/DL CCE pattern unit First, a predefined CCE ratio that is closest to the CCE ratio required for UL/DL is selected from the predefined set of UL/DL CCE ratio as the applicable UL/DL CCE ratio, noted as r'. If the difference between two adjacent predefined CCE ratios and the required CCE ratio is equal, in order to better match the system frame structure characteristics, for TDD, the one with the larger CCE ratio value among the two is selected as r', for FDD, the one with the smaller CCE ratio value among the two is selected as r'. Thereafter, the applicable UL/DL CCE pattern units are selected from the predefined UL/DL CCE pattern set based on the above selected UL/DL CCE ratio r' and the maximum CCE aggregation level ALmax.

(2) determining the UL/DL CCE patterns for the current first predefined period based on the length corresponding to the total number of CCEs and the UL/DL CCE pattern unit.

If the length corresponding to the total number of CCEs available for UL/DL is an integer multiple of the length of the UL/DL CCE pattern unit, the UL/DL CCE pattern unit are cycled according to the CORESET resource size, i.e., the UL/DL CCE patterns for the current first preset period is determined according to the CORESET resource size and the UL/DL CCE pattern unit.

If the length corresponding to the total number of CCEs available for UL/DL is not an integer multiple of the length of the UL/DL CCE pattern units, i.e., the tail CCE length is less than the length of the UL/DL CCE pattern units, the UL/DL tail CCE lengths need to be computed based on the ratio r of CCEs required in the UL/DL, and the tail CCE pattern is generated with the following computation formula.

$$TailDLCCElength = \text{Ceil}\left(\frac{TailCCEnumber}{r+1}\right)$$

TailULCCElength=TailCCEnumber−TailDLCCElength

Where, Tail CCE number is the number of tail CCE, Tail DL CCE length is the length of tail DL CCE, and Tail UL CCE length is the number of tail UL CCE.

Second, if the CCE ratio required for UL/DL does not fall within the predefined UL/DL CCE ratio, the current first pre-defined period UL/DL CCE pattern is determined based on the CCE ratio required for UL/DL and the total number of CCEs available for UL/DL, including determining an UL CCE pattern and a DL CCE pattern based on the ratio of CCEs required for UL/DL and the total number of CCEs available for UL/DL, and determining an UL/DL CCE patterns for the current first preset period based on the UL CCE pattern and the DL CCE pattern.

Specifically, if the ratio of CCEs required for UL/DL are outside the predefined UL/DL CCE ratio, to ensure the accuracy of the UL/DL CCE ratio assignment, supplementary CCE patterns need to be dynamically generated to perform the processing of supplementary UL/DL CCE patterns.

First, the applicable CCE quantities for UL/DL are computed based on the CCE ratio r required for UL/DL and the total number of CCEs available for UL/DL, respectively, while ensuring that the number of UL/DL CCE cannot be less than the maximum CCE aggregation level that the system needs to support.

When the ratio of CCEs required for UL/DL r>=1,

DL CCE length=min(Ceil(total CCE number/(r+1)), ALmax)

UL CCE length=total CCE number−DL CCE length

When the ratio of CCEs required for UL/DL r<1,

UL CCE length=min(Ceil(total CCE number/(1/r+ 1)),ALmax)

DL CCE length=total CCE number−UL CCE length where total CCE number is the total number of CCEs corresponding to the final CORESET resource, the determination of which has been described in the previous implementation;

DL CCE length is the applicable DL CCE allocation number; and

UL CCE length is the applicable UL CCE allocation number.

Second, the supplementary UL/DL CCE patterns may also be generated in two ways. Way 1, the supplementary UL/DL CCE patterns are generated by following the same steps in the generation process of the predefined UL/DL CCE patterns with tail CCE processing. Way 2, the supplementary UL/DL CCE patterns are generated in the same way as the tail CCE processing.

The following is an example to further illustrate the process of confirming the UL/DL CCE patterns by assuming that the ratio of CCEs required for UL/DL is 1.15, ALmax is 4, and the total number of CCEs corresponding to the final CORESET is 22 (i.e., the total number of CCEs available for UL/DL is 22), the ratio 4 (1/1) that is closest to 1.15 is selected, and the predefined UL/DL CCE patterns is selected according to ALmax=4, which is 4U-4D. After repeating according to 4U-4D, the tail CCE length is 6, the tail DL CCE length is ceil(6/(1.15+1))=3, and the tail UL CCE length is (6-3)=3. The finalized UL/DL CCE patterns are shown in FIG. 6C.

Figure 6C:
FIG. 6C is UL/DL CCE pattern determined according to an embodiment of the disclosure.

FIG. 6C is UL/DL CCE pattern determined according to an embodiment of the disclosure.

*203 Referring to FIG. 6C, in an embodiment of the disclosure, the method may further include acquiring the number of CCEs required for UL/DL for at least one previous second preset period, the previous second preset period being previous to the current second preset period and the current second preset period and the previous second preset period both belonging to the current first preset period, determining the number of CCEs required for UL/DL for the current second preset period based on the number of CCEs required for UL/DL for the previous second preset period, and determining the UL/DL CCE patterns for the current second preset period based on the number of CCEs required for UL/DL for the current second preset period.

Wherein, the current first preset period may be divided into a plurality of second preset periods, and wherein the CORESET time-frequency resources and the UL/DL CCE patterns for the current first preset period are determined in the preceding embodiment of the disclosure, and wherein the CORESET time-frequency resources for the current first preset period are kept constant in the embodiment of the disclosure while the UL/DL CCE patterns for each second preset period are dynamically adjusted.

Specifically, in a similar manner to the determination of the UL/DL CCE patterns for the current first preset period, the number of CCEs for the current second preset period is predicted based on the number of CCEs required for UL/DL for the previous second preset period and the data resource utilization rate, and the UL/DL CCE patterns for the current second preset period are determined based on the predicted number of CCEs required for UL/DL.

It is noted that for the current second preset period, there are some differences in the process of determining the UL/DL CCE patterns thereof as compared to the determination of the UL/DL CCE patterns for the current first preset period, and these differences will be described below.

In an embodiment of the disclosure, the acquiring of the number of CCEs required for UL/DL for at least one previous second preset period includes acquiring the number of CCEs used for UL/DL, the number of CCEs banned for UL/DL, and the total number of CCEs available for UL/DL, for the previous second preset period and performing a filtering process, and acquiring the number of CCEs required for UL/DL based on the number of CCEs used for UL/DL, the number of CCEs banned for UL/DL and the total number of CCEs available for UL/DL after the filtering process.

Figure 7:
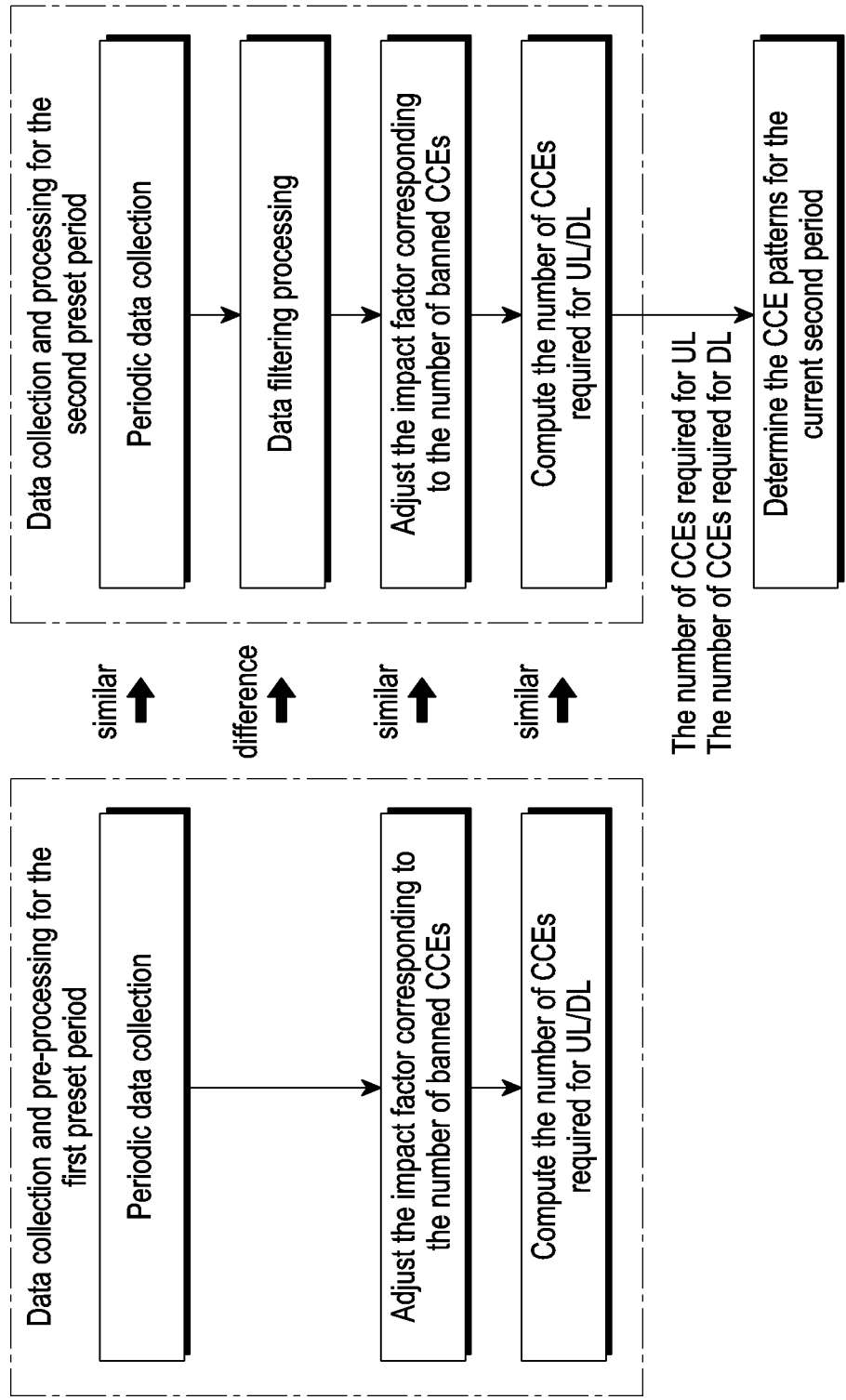
FIG. 7 is a schematic diagram of comparing a periodic data acquisition process between a current second preset period and a current first preset period according to an embodiment of disclosure.

FIG. 7 is a schematic diagram of comparing a periodic data acquisition process between a current second preset period and a current first preset period according to an embodiment of disclosure.

Referring to FIG. 7, compared to the CCE pattern determination process for the current first preset period, the CCE pattern determination process for the current second preset period has added data filtering processing. Specifically, in order to prevent sudden data from adversely affecting the system performance, a data filtering process can be added to increase the robustness and stability of the algorithm for the statistics of one or more previous second preset periods in the current first preset period.

Specifically, the number of CCEs used for UL/DL and the number of CCEs banned for UL/DL need to be filtered, and classical digital filter techniques, such as finite impulse response FIR) filter, infinite impulse response IIR) filter, or the like, may be used to perform the filtering process. When the IIR filter is used, the number of used CCEs, for example, is computed as follows:

number of CCEs used after filtering=$(1-\varepsilon)$*number of CCEs used after filtering in the last short period T+$\varepsilon$* number of CCEs used in the last short period T; and where $\varepsilon$ is an adjustable filtering weight parameter, and when the value of $\varepsilon$ is larger, the parameter of the previous short period has a larger weight. The initial value of $\varepsilon$ may be set to 0.5.

In an embodiment of the disclosure, the determining of the UL/DL CCE patterns for the current second preset period based on the number of CCEs required for UL/DL for the current second preset period includes acquiring a ratio of CCEs required for UL/DL based on the number of CCEs required for UL/DL for the current second preset period, and determining the UL/DL CCE patterns for the current second preset period based on the ratio of CCEs required for UL/DL if a preset condition is met, wherein the preset condition comprises the increase in the ratio of CCEs required for UL/DL relative to the previous second preset period is not less than the sixth preset value, and the utilization rate of the UL CCE is not less than the seventh preset value and the utilization rate of the DL CCE is not greater than an eighth preset value, or wherein the decrease in the ratio of CCEs required for UL/DL relative to the previous second preset period is not less than the sixth preset value, and the utilization rate of the UL CCE is not greater than the eighth preset value and the utilization rate of the DL CCE is not less than the seventh preset value.

Figure 8A:
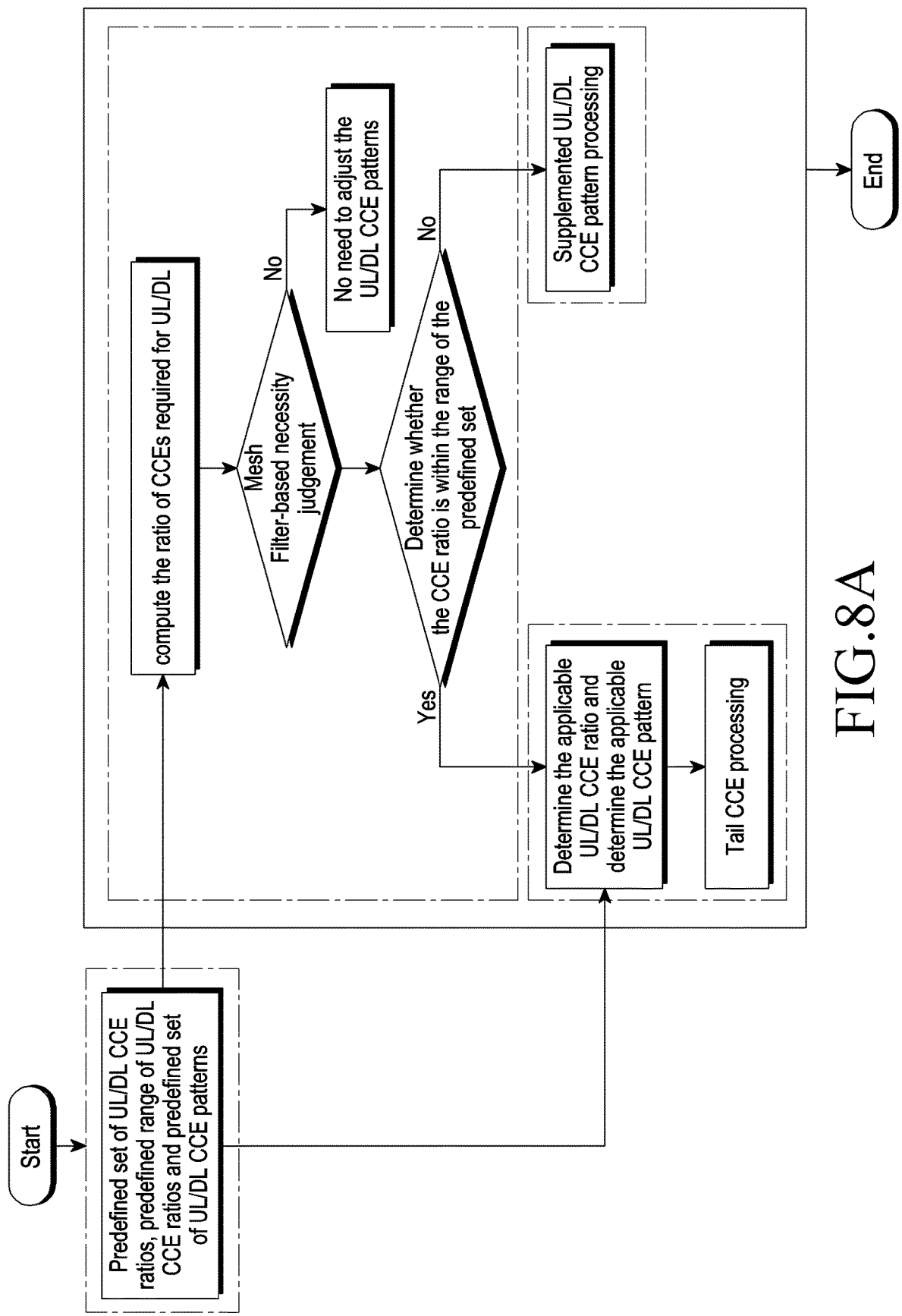
FIG. 8A is a schematic flowchart of determining a UL/DL CCE pattern in a current second preset period according to an embodiment of the disclosure.

FIG. 8A is a schematic flowchart of determining a UL/DL CCE pattern in a current second preset period according to an embodiment of the disclosure.

Referring to FIG. 8A, compared to the CCE pattern determination process for the current first preset period, the CCE pattern determination process for the current second preset period adds a Mesh Filter-based necessity judgement to prevent excessive and non-essential UL/DL CCE pattern adjustments.

Figure 8B:
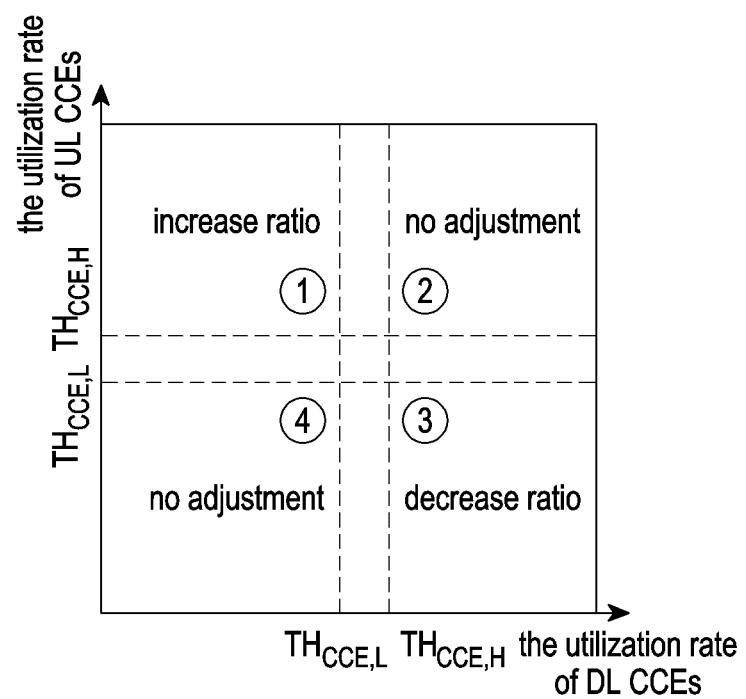
FIG. 8B is a schematic diagram of performing a necessity judgement of adjusting UL/DL CCE ratio according to an embodiment of the disclosure.

FIG. 8B is a schematic diagram of performing a necessity judgement of adjusting UL/DL CCE ratio according to an embodiment of the disclosure.

Referring to FIG. 8B, the UL/DL CCE pattern adjustment for the current second preset period is made if the preset conditions are met, otherwise no adjustment is made.

Case ①: the current second preset period is adjusted to increase the number of UL/DL CCE patterns if the ratio r of CCEs required for UL/DL increases compared to the previous second preset period and if the following three conditions are satisfied at the same time. The three conditions are as follows:

$r(k)-r(k-1)$>THCCE, R (i.e., the sixth preset value), where $r(k)$ denotes the ratio of CCEs required for UL/DL for the current second preset period and $r(k-1)$ denotes the ratio of CCEs required for UL/DL for the previous second preset period;

CCE utilization ratio after UL filtering>THCCE, H (i.e., the seventh preset value);

CCE utilization ratio after DL filtering<THCCE, L (i.e., the eighth preset value);

Otherwise, the UL/DL CCE patterns are not adjusted.

Case ③: if the value of r decreases for the current second preset period compared with the previous second preset period, and if the following three conditions are satisfied at the same time, the UL/DL CCE patterns are adjusted to increase the number of DL CCEs. The three conditions are as follows:

$r(k-1)-r(k)$>THCCE,R;

CCE utilization ratio after UL filtering<THCCE,L;

CCE utilization ratio after DL filtering>THCCE,H;

Otherwise, the UL/DL CCE patterns are not adjusted.

Case ②: if the value of r increases for the current second preset period compared with the previous second preset period, but the DL CCE utilization rate is higher than a certain threshold, it means that there is not enough space to adjust the number of UL CCE, and it is decided not to adjust the UL/DL CCE patterns.

Case ④: if the value of r decreases for the current second preset period compared with the previous second preset period, but the utilization rate of DL CCE is also lower, it means that the number of UL/DL CCE is in an overall sufficient state compared with the service requirement, and it is decided not to adjust the UL/DL CCE patterns.

It should be noted that the parameter thresholds involved in the above process, including the values of THCCE, R, THCCE, H, and THCCE, L, may be set according to real requirements.

Figure 9A:
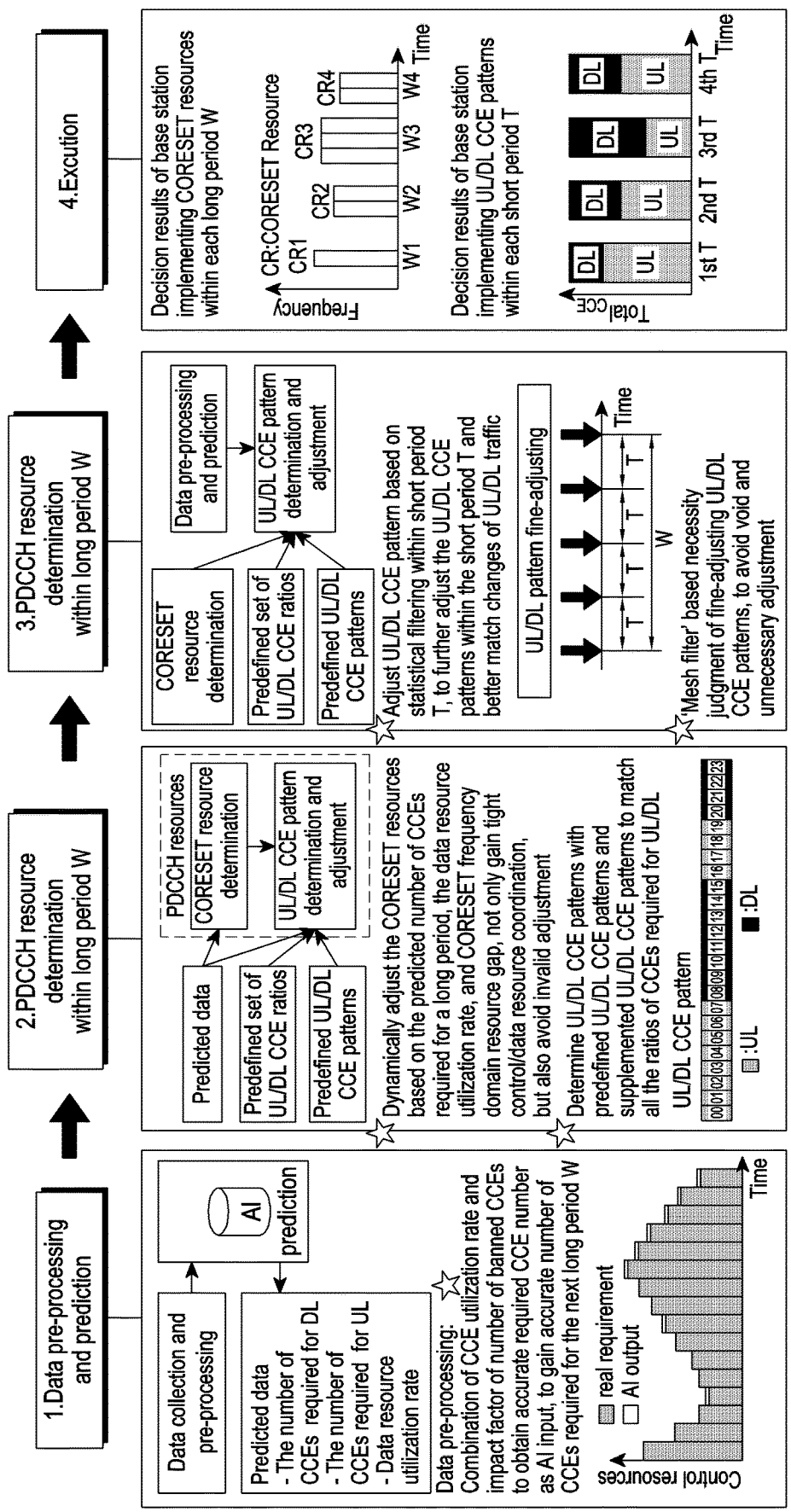
FIG. 9A is an overall framework diagram of a control resource allocation method according to an embodiment of the disclosure.
Figure 9B:
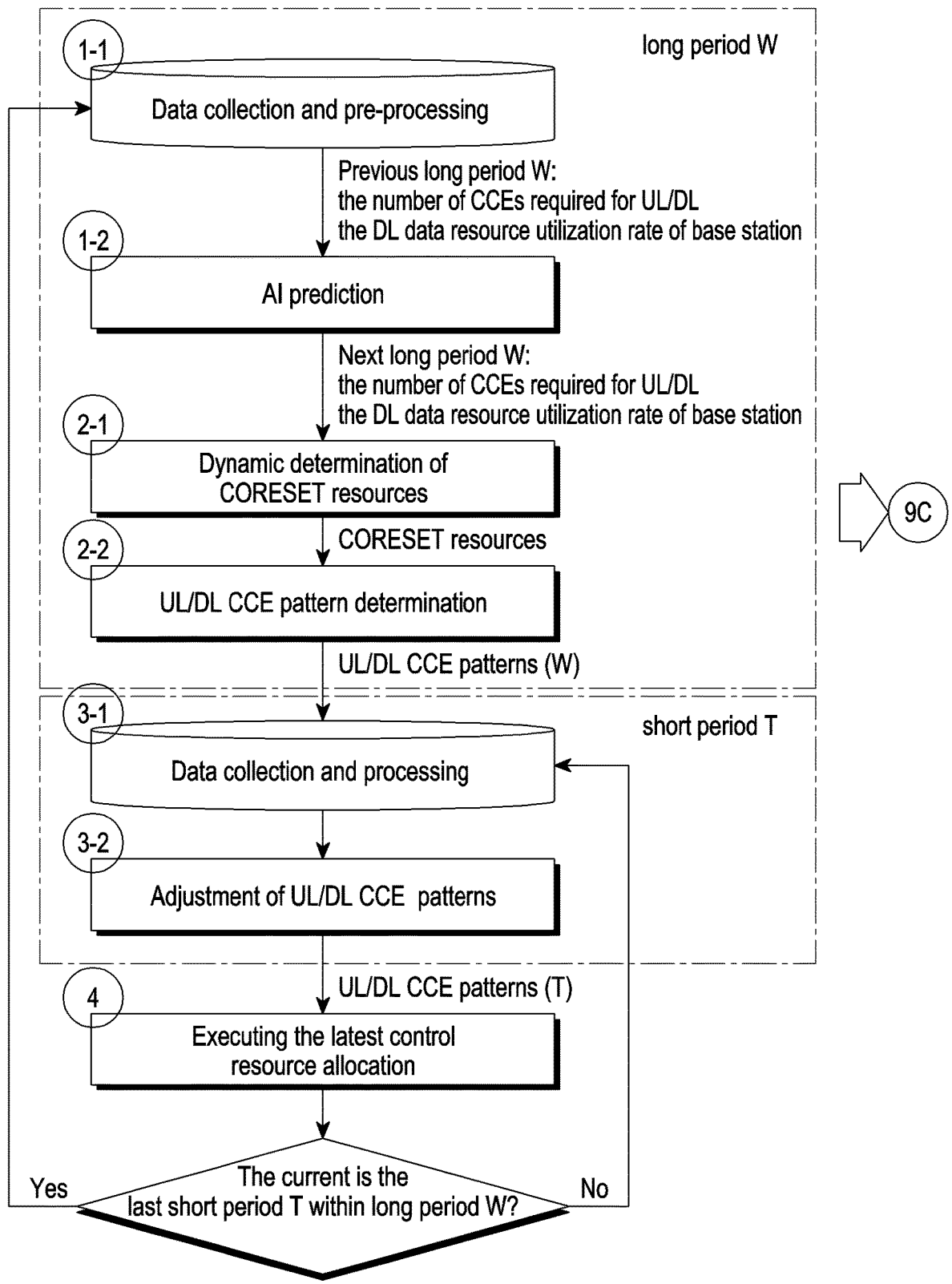
FIG. 9B is a schematic diagram of an overall flow of a control resource allocation method according to an embodiment of the disclosure.
Figure 9C:
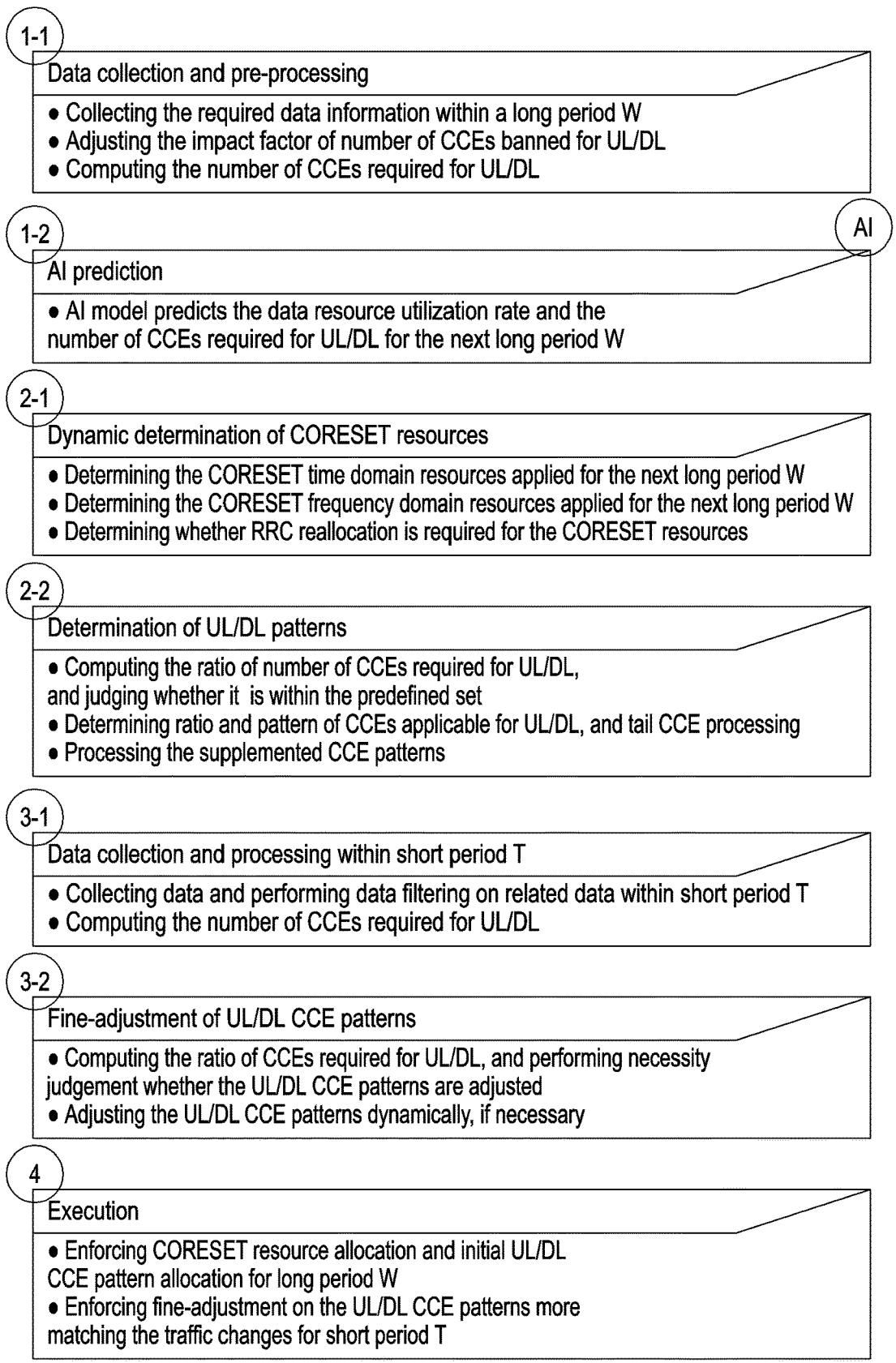
FIG. 9C is a block diagram of an overall flow of a control resource allocation method according to an embodiment of the disclosure.

The following is an overall description of the control resource allocation scheme in an embodiment of the disclosure in conjunction with FIGS. 9A to 9C, where the long period W is the aforementioned first preset period, the short period T is the aforementioned second preset period, and W=N*T. The values of W and T can be configured accordingly to the network deployment scenario as well as the service load.

FIG. 9A is an overall framework diagram of a control resource allocation method according to an embodiment of the disclosure.

FIG. 9B is a schematic diagram of an overall flow of a control resource allocation method according to an embodiment of the disclosure.

FIG. 9C is a block diagram of an overall flow of a control resource allocation method according to an embodiment of the disclosure.

Referring to FIG. 9A, illustrates the overall framework of the scheme, the disclosure consists of four main steps:

Step (1): data collection, pre-processing, and prediction

The required data information is collected within a long period W, and the data is pre-processed and used as AI input for prediction in the next long period W. Specifically, this includes:
 periodic data collection: the number of CCEs used by base station for UL, the number of CCEs used by base station for DL, the number of CCEs banned by base station for UL, the number of CCEs banned by base station for DL, and the utilization rate of base station DL data resources;
 data pre-processing: the impact factors of CCE utilization rate and the number of banned CCEs are combined to get a more accurate number of required CCEs as AI input;
 AI prediction: the AI model is trained to get the number of CCEs required for UL, the number of CCEs required for DL and the data resource utilization rate for the next long period W.

Step (2): determination of PDCCH resources in long period W and initial UL/DL CCE patterns

*242 Based on the AI prediction results, the PDCCH resources and the initial UL/DL CCE patterns for the next long period W are determined. which includes:
 Step 1: determining the CORESET time-frequency domain resources for the next long period W based on the AI prediction of the number of CCEs required for UL/DL, data resource utilization rate, and the change amount of the required CORESET frequency domain resources.
 Step 2: judging whether the CORESET time-frequency domain resources have changed, and if so, reallocating the CORESET resources through RRC signaling.
 Step 3: determining the initial UL/DL CCE patterns for the next long period W by combining predefined UL/DL CCE patterns and supplementary UL/DL CCE patterns to ensure the ratio of CCEs that can cover all the UL/DL requirements.

Step (3): fine-adjustment the UL/DL CCE patterns within short period T

The data are collected within the short period T, and the UL/DL CCE patterns within the short period T are further fine-adjusted by statistical filtering and Mesh Filter to better match the dynamic changes of the UL/DL services. which includes:
 Step 1: collecting data within short period T and doing data filtering on relevant data, and finally computing the number of CCEs for UL/DL demands;
 Step 2: computing the ratio of CCEs required for UL/DL, and making a necessity judgment of whether the UL/DL CCE patterns need to be adjusted by the Mesh Filter method, and dynamically adjusting the UL/DL CCE patterns within the short period T if they need to be adjusted.

Step (4): executing the latest control resource allocation

Step 1: for long period W, performing CORESET resource allocation and initial UL/DL CCE pattern allocation Step 2: for short period T, performing fine-adjustment on the UL/DL CCE patterns more matching the traffic changes As can be seen above, in the scheme of this application, by dynamically coordinating the control and data resources in the long period W and dynamically adjusting the UL/DL CCE patterns in the short period T, it is possible to fully utilize the time-frequency resources and scheduling capability of the base station to match the service changes, thus improving the user experience and the performance of the cell.

The execution flow of the scheme is illustrated in FIGS. 9B and 9C, which includes:

*255 First, the base station collects relevant data within the statistical long period W and pre-processes the collected data in order to dynamically adjust the CORESET resources according to the dynamically changing service requirements. In this process, AI methods can be used for forecasting the number of CCEs for UL requirements, the number of CCEs for DL requirement, and the data resource utilization rate.

Second, the data based on AI prediction is used to determine and dynamically adjust the CORESET resources for the next long period W and the initial UL/DL CCE patterns. In this process, CORESET resources are dynamically adjusted based on the predicted number of CCEs required for UL/DL, data resource utilization rate, and the change amount of the required CORESET frequency domain resources, which not only obtains more appropriate control and coordination of data resources, but also avoids ineffective adjustment. In addition, the UL/DL CCE patterns are determined by combining the predefined UL/DL CCE patterns with the supplementary UL/DL CCE patterns to match the ratio of all CCEs required for UL/DL.

Thereafter, the base station further adjusts the UL/DL CCE patterns within short period T based on the data collection and statistical filtering within short period T to better match the changes of UL/DL services. In this process, the 'grid filter' method is used to judge the necessity of fine-adjustment the UL/DL CCE patterns to avoid ineffective and unnecessary adjustments.

Finally, the base station implements the CORESET resource adjustment and initial UL/DL CCE pattern allocation at each long period W. At each short period T within the long period W, the fine-adjustment on the UL/DL CCE patterns is performed to better match the service dynamics. In the long period W, if CORESET resources need to be adjusted, the adjustment details need to be passed to the CALL module to trigger the sending of RRC reassignment messages to the connected state UEs, and when the UE receives the CORESET allocation, it needs to apply the new CORESET allocation to detect the downlink control information, DL control information (DCI). And for the adjustment of the UL/DL CCE patterns within either long period W or short-period T, it does not involve sending RRC reassignment messages to the UE, but only requires the medium access control (MAC) to apply the latest CCE pattern during the resource allocation process.

It should be noted that the scheme of this application is not only applicable to 5G communication systems, but also can be applied to other communication systems that require dynamic allocation of control resources.

There are two deployment options for this application implementation. Option 1 is shown in FIG. 10A.

Figure 10A:
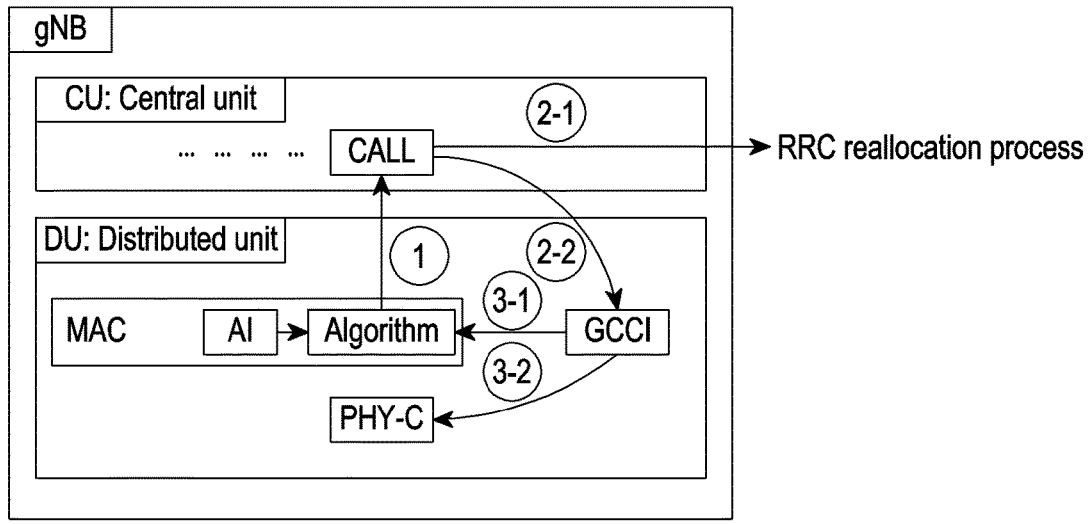
FIG. 10A is a schematic diagram of a deployment scheme provided according to an embodiment of the disclosure.

FIG. 10A is a schematic diagram of a deployment scheme provided according to an embodiment of the disclosure.

Referring to FIG. 10A, the AI module and the algorithm module in this embodiment of the disclosure are deployed in the MAC module of the distributed unit (DU) in the 5G base station.

Regarding the operation for the current first preset period:

Step 1: with the first preset period W as the period, when it is determined that the PDCCH resource needs to be modified based on this application which is an embodiment of the solution, a request message is sent to the CALL module in the centralized unit, central unit (CU) with details of the modification in the message.

Step 2: the CALL module will perform (2-1) and (2-2), (2-1) for the connected-state UE, triggering the RRC reassignment process for changing CORESET parameters, and (2-2) when (2-1) is completed, notifying the confirmed CORESET parameters in the form of a gNB internal interface message to the GCCI (gNB Call Control Interface, 5G base station CALL control interface).

Step 3: after receiving the (2-2) message from the CALL module, the GCCI pushes the CORESET parameter allocation to the MAC module (corresponding to 3-1) and the physical-controller (PHY-C) module (corresponding to 3-2).

Regarding the operation of the second preset period T: this period does not contain RRC operations, and the MAC module and PHY-C module output the results directly using the algorithm of period T.

Figure 10B:
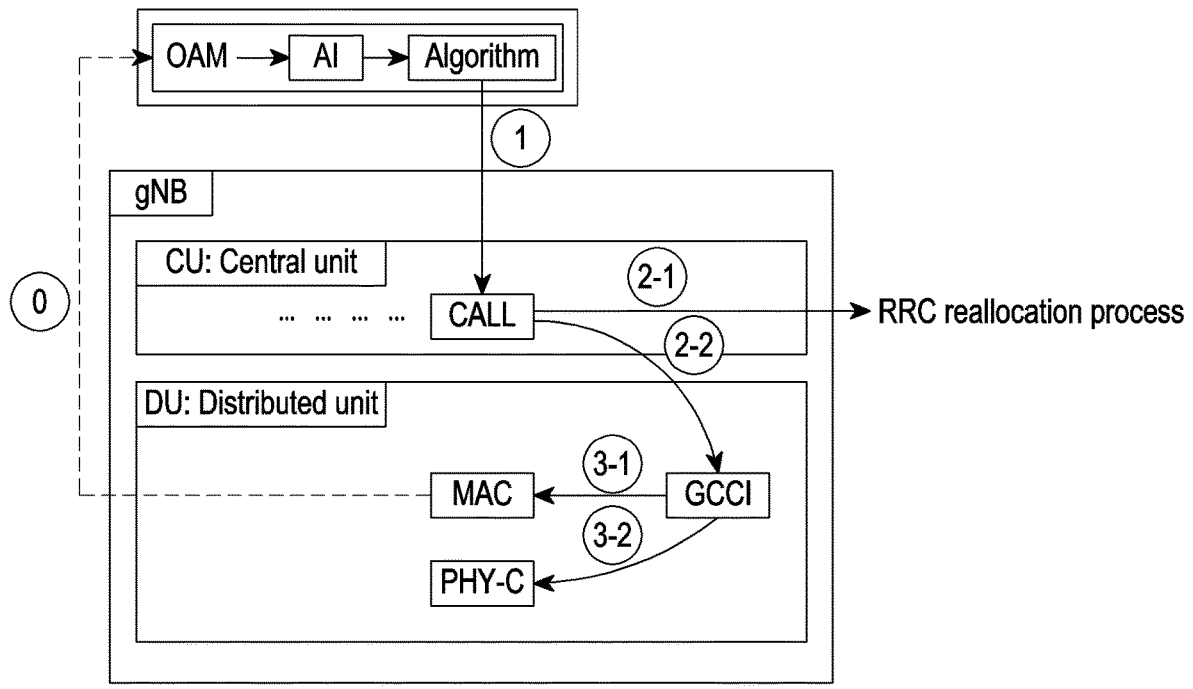
FIG. 10B is a schematic diagram of a deployment scheme according to an embodiment of the disclosure.

FIG. 10B is a schematic diagram of a deployment scheme according to an embodiment of the disclosure.

Referring to FIG. 10B, in option 2, the AI module and the algorithm module in this embodiment of the disclosure are deployed in the operations, administration and maintenance (OAM) module of the equipment provider.

Regarding the operation of the first preset period W: the two differences between option 2 and option 1 are as follows, and the other operations are no different from option 1.

(1) the statistical information required by the AI module and the algorithm (Algorithm) module in this disclosure is directly provided by the OAM module. Among them, the main function of OAM is to collect statistical information.

(2) the modification request message from the algorithm module to the CALL module in step 1 needs to be implemented through the interface between OAM and CU.

Regarding the operation of short period T: for short period T, there is no need to trigger the RRC message, so all operations are consistent with long period W except that step (2-1) is not included.

In summary, the embodiment of the disclosure brings the following beneficial effects.

In the first aspect, through the dynamic adjustment of CORESET time-frequency resources under long period W, the idle control resources can be used as data resources, while the utilization rate of control resources are significantly improved, with the increase of data resources at the base station, the data transmission rate is significantly improved, and the scheduling delay of the service is greatly reduced, the dynamic CORESET resource allocation timely ensures the optimal allocation of control and data resources in time, so as to acquire a win-win situation in terms of control and the data resource utilization rate.

In the second aspect, by dynamically adjusting the UL/DL CCE patterns, the idle CCE reserved for UL authorization can be used for DL authorization, it can be seen from the utilization rate of control resources that the utilization rate of CCE for UL authorization is improved and the scarcity of CCE for DL authorization is relieved. With more DL authorized CCEs, more DL online users can be scheduled at the same time, effectively avoiding further waste of DL data resources due to the scarcity of DL authorized CCE resources; the overall CCE resource utilization rate is improved, greatly improving the average cell throughput performance and reducing the scheduling delay with almost no impact on UL performance.

Figure 11:
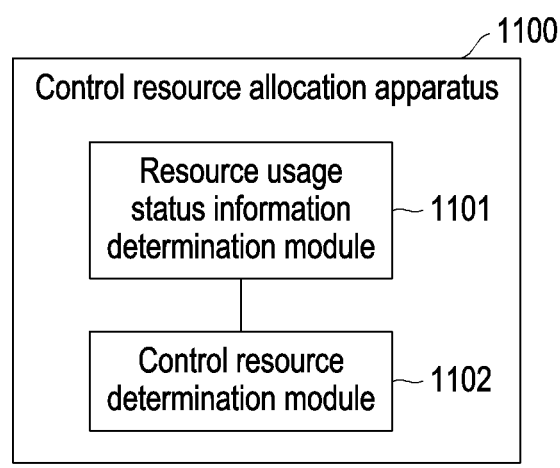
FIG. 11 is a structural block diagram of a control resource allocation apparatus according to an embodiment of the of the disclosure.

FIG. 11 is a structural block diagram of a control resource allocation apparatus according to an embodiment of the disclosure.

Referring to FIG. 11, an apparatus 1100 may include a resource usage status information determination module 1101 and a control resource determination module 1102, wherein:

a resource usage status information determination module 1101 is configured to determining resource usage status information for the current first preset period;

a control resource determination module 1102 is configured to determine the control resource set CORESET time-frequency resources and UL/DL control channel element CCE patterns for the current first preset period, based on the resource usage status information.

The embodiment of the disclosure configures the control resources for the current first preset period based on the resource usage status for the current first preset period, realizes dynamic adjustment of the control resources, and can be applied to scenarios where the control resource requirement changes over time.

In an embodiment of the disclosure, the resource usage status information determination module is specifically configured to acquire historical resource usage status information, and determine the resource usage status information for the current first preset period based on the historical resource usage status information.

In an embodiment of the disclosure, the resource usage status information determination module is further configured to acquire a historical number of CCEs used for UL/DL, a number of CCEs banned for UL/DL, and a total number of CCEs available for UL/DL, and acquire the number of CCEs required for UL/DL based on the number of CCEs used for UL/DL, the number of CCEs banned for UL/DL, and the total number of CCEs available for UL/DL.

In an embodiment of the disclosure, the resource usage status information determination module is further configured to acquire a CCE utilization rate based on the number of CCEs used for UL/DL and the total number of CCEs available for UL/DL, and acquire a ratio of banned CCEs based on the number of CCEs banned for UL/DL and the total number of CCEs available for UL/DL, determine an impact factor corresponding to the number of CCEs banned for UL/DL based on the ratio of banned CCEs, and acquire the number of CCEs required for UL/DL, based on the CCE utilization rate, the number of CCEs used for UL/DL, the number of CCEs banned for UL/DL, and the impact factor.

In an embodiment of the disclosure, the impact factor includes the first impact factor and the second impact factor, and the resource utilization status information determination module is further configured to determine the number of CCEs required for UL/DL based on the number of CCEs used for UL/DL, the number of CCEs banned for UL/DL, and the first impact factor, if the CCE utilization rate is not less than the first preset value, determine the number of CCEs required for UL/DL based on the number of CCEs used for UL/DL, the number of CCEs banned for UL/DL, and the second impact factor, if the CCE utilization rate is less than the first preset value and not less than the second preset value, and take the number of CCEs used for UL/DL as the number of CCEs required for UL/DL, if the CCE utilization rate is less than the second pre-determined value.

In an embodiment of the disclosure, the resource usage status information determination module is further configured to use a prediction model to predict the resource usage status information for the current first preset period based on the historical resource usage status information.

In an embodiment of the disclosure, the historical resource usage status information includes resource usage status information for at least one previous first preset period.

In an embodiment of the disclosure, the control resource determination module includes a CORESET time-frequency resource determination sub-module and a CCE pattern determination sub-module, wherein the CORESET time-frequency resource determination sub-module is configured to determine the CORESET time-frequency resources for the current first preset period, based on the resource usage status information, and wherein the CCE pattern determination sub-module is configured to determine an UL/DL CCE patterns for the current first preset period, based on the CORESET time-frequency resource.

In an embodiment of the disclosure, the CORESET time-frequency resource determination sub-module includes a CORESET time-domain resource determination sub-module and CORESET frequency domain resource determination sub-module, wherein the CORESET time-domain resource determination sub-module is configured to determine CORESET time domain resources for the current first preset period based on the number of CCEs required for UL/DL, and wherein the CORESET frequency domain resource determination sub-module is configured to determine CORESET frequency domain resources for the current first preset period based on the number of CCEs required for UL/DL and the CORESET time domain resources.

In an embodiment of the disclosure, the CORESET time-domain resource determination sub-module is specifically configured to determine the CORESET time domain resources for the current first preset period based on the number of CCEs required for UL/DL and the data resource utilization rate.

In an embodiment of the disclosure, the CORESET time domain resource determination sub-module is further configured to acquire the required CORESET time domain resources based on the number of CCEs required for UL/DL, take the historical CORESET time domain resources as the CORESET time domain resources for the current first preset period, if the required CORESET time domain resources are not less than the historical CORESET time domain resources and the data resource utilization rate is not less than the third preset value, take the historical CORESET time domain resources as the CORESET time domain resources for the current first preset period, if the required CORESET time domain resources are not greater than the historical CORESET time domain resources and the data resource utilization rate is not greater than the fourth preset value, and determine the required CORESET time domain resources as the CORESET time domain resources for the current first preset period, if the above conditions are not met.

In an embodiment of the disclosure, the CORESET frequency domain resource determination sub-module is specifically configured to acquire required CORESET frequency domain resources based on the number of CCEs required for UL/DL and the CORESET time domain resources, and determine the CORESET frequency domain resources for the current first preset period based on the required CORESET frequency domain resources and the CORESET time domain resources.

In an embodiment of the disclosure, the CORESET frequency domain resource determination sub-module is further configured to determine the historical CORESET frequency domain resources as the CORESET frequency domain resources for the current first preset period, if the CORESET time domain resources are the same as the historical CORESET time domain resources and the change amount of the required CORESET frequency domain resources is not greater than the fifth preset value compared to the historical CORESET frequency domain resources, and determine the required CORESET frequency domain resources as the CORESET frequency domain resources for the current first preset period, if the above conditions are not met.

In an embodiment of the disclosure, the CCE pattern determination sub-module is specifically configured to determine the UL/DL CCE patterns for the current first preset period based on the number of CCEs required for UL/DL and the CORESET time-frequency resources.

In an embodiment of the disclosure, the CCE pattern determination sub-module is further configured to acquire a ratio of CCEs required for UL/DL based on the number of CCEs required for UL/DL for the current first preset period, and determine the UL/DL CCE patterns for the current first preset period based on the ratio of CCEs required for UL/DL and the CORESET time-frequency resources.

In an embodiment of the disclosure, the CCE pattern determination sub-module is further configured to determine the total number of CCEs available for UL/DL based on the CORESET time-frequency resources, determine the UL/DL CCE patterns for the current first preset period based on ratio of CCEs required for UL/DL, predefined set of UL/DL CCE ratios, predefined set of UL/DL CCE patterns, and the total number of CCEs available for UL/DL, if the ratio of CCEs required for UL/DL falls within a predefined range of UL/DL CCE ratios, and determine the UL/DL CCE patterns for the current first preset period based on the ratio of CCEs required for UL/DL and the total number of CCEs available for UL/DL, if the ratio of CCEs required for UL/DL does not fall within the predefined UL/DL CCE ratio.

In an embodiment of the disclosure, the CCE pattern determination sub-module is further configured to acquire an UL/DL CCE ratio from the predefined set of UL/DL CCE ratios based on the ratio of CCEs required for UL/DL, and determine to acquire the UL/DL CCE patterns for the current first preset period based on the UL/DL CCE ratios, the predefined set of UL/DL CCE patterns, and the total number of CCEs available for UL/DL.

In an embodiment of the disclosure, the CCE pattern determination sub-module is further configured to determine a maximum CCE aggregation level for the current first preset period, select a corresponding UL/DL CCE pattern unit from the predefined sets of UL/DL CCE patterns based on the UL/DL CCE ratios and the maximum CCE aggregation level, and determine the UL/DL CCE patterns for the current first predefined period based on the UL/DL CCE pattern unit and the total number of CCEs available for UL/DL.

In an embodiment of the disclosure, the CCE pattern determination sub-module is further configured to determine the UL/DL CCE patterns for the current first preset period based on the UL/DL CCE pattern unit, if a length corresponding to the total number of CCEs available for UL/DL is an integer multiple of the length of the UL/DL CCE pattern unit, and acquire an UL/DL tail CCE pattern based on the ratio of CCEs required for UL/DL and the total number of CCEs available for UL/DL, and determine the UL/DL CCE patterns for the current first preset period, based on the UL/DL CCE pattern unit and the UL/DL tail CCE pattern, if the length corresponding to the total number of CCEs available for UL/DL is not an integer multiple of the length of the UL/DL CCE pattern unit.

In an embodiment of the disclosure, the CCE pattern determination sub-module is specifically configured to determine an UL CCE pattern and a DL CCE pattern based on the ratio of CCEs required for UL/DL and the total number of CCEs available for UL/DL, and determine the UL/DL CCE patterns for the current first preset period based on the UL CCE pattern and the DL CCE pattern.

In an embodiment of the disclosure, the apparatus further includes a CCE pattern adjustment module configured to acquire the number of CCEs required for UL/DL for at least one previous second preset period, the previous second preset period being previous to the current second preset period and the current second preset period and the previous second preset period both belonging to the current first preset period, determine the number of CCEs required for UL/DL for the current second preset period based on the number of CCEs required for UL/DL for the previous second preset period, and determine the UL/DL CCE patterns for the current second preset period based on the number of CCEs required for UL/DL for the current second preset period.

In an embodiment of the disclosure, the CCE pattern adjustment module is specifically configured to acquire the number of CCEs used for UL/DL, the number of CCEs banned for UL/DL, and the total number of CCEs available for UL/DL, for the previous second preset period and perform a filtering process, and acquire the number of CCEs required for UL/DL based on the number of CCEs used for UL/DL, the number of CCEs banned for UL/DL and the total number of CCEs available for UL/DL after the filtering process.

In an embodiment of the disclosure, the CCE pattern adjustment module is specifically configured to acquire a ratio of CCEs required for UL/DL based on the number of CCEs required for UL/DL for the current second preset period, and determine the UL/DL CCE patterns for the current second preset period based on the ratio of CCEs required for UL/DL if a preset condition is met, wherein the preset condition includes the increase in the ratio of CCEs required for UL/DL relative to the previous second preset period is not less than the sixth preset value, and the utilization rate of the UL CCE is not less than the seventh preset value and the utilization rate of the DL CCE is not greater than the eighth preset value, or wherein the decrease in the ratio of CCEs required for UL/DL relative to the previous second preset period is not less than the sixth preset value, and the utilization rate of the UL CCE is not greater than the eighth preset value and the utilization rate of the DL CCE is not less than the seventh preset value.

Figure 12:
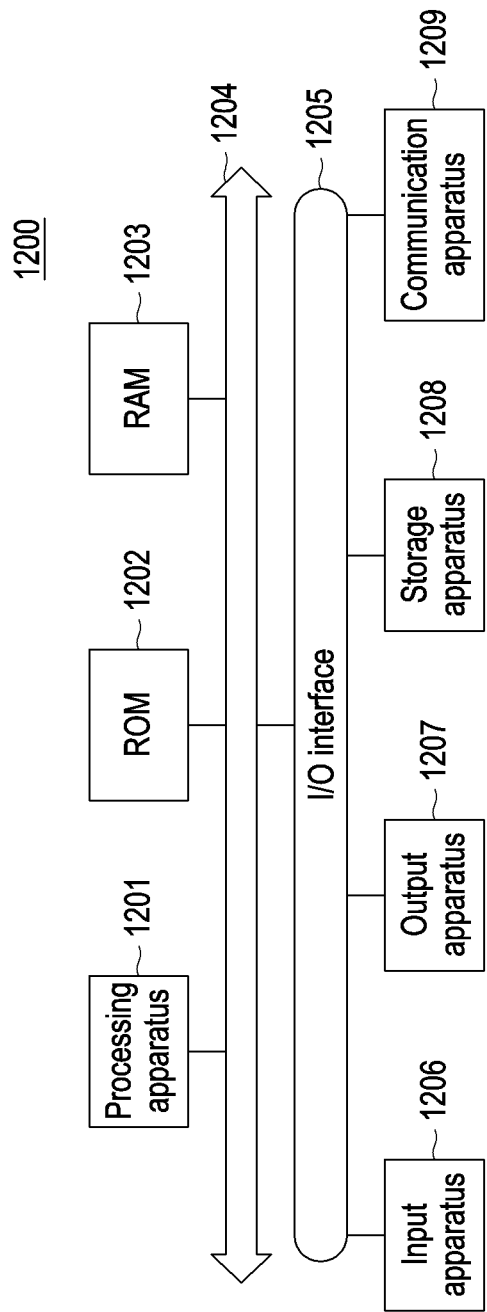
FIG. 12 is a schematic structural diagram of an electronic device according to an embodiment of the disclosure.

FIG. 12 is a schematic structural diagram of an electronic device according to an embodiment of the disclosure.

Referring to FIG. 12, a schematic structural diagram of an electronic device (e.g., a terminal device or a server performing the method shown in FIG. 3) 1200 suitable for implementing an embodiment of the disclosure is shown. Electronic devices in the embodiments of the disclosure may include, but are not limited to, mobile terminals, such as cell phones, laptop computers, digital broadcast receivers, personal digital assistants (PDAs), tablet computers (PADs), portable multimedia players (PMPs), vehicle terminals (e.g., vehicle navigation terminals), wearable devices, and the like, and fixed terminals, such as digital televisions (TVs), desktop computers, and the like. The electronic device illustrated in FIG. 12 is only an example and should not impose any limitations on the functionality and scope of use of the embodiments of the disclosure.

The electronic device includes a memory, and a processor, the memory is used to store a program for executing the method described in each of the method embodiments described above, the processor is configured to execute the program stored in the memory. Herein, the processor may be referred to as a processing apparatus 1201 as described below, and the memory may include at least one of read only memory (ROM) 1202, a random access memory (RAM) 1203, and a storage apparatus 1208 as shown below.

As shown in FIG. 12, the electronic device 1200 may include a processing apparatus (e.g., a central processor, a graphics processor, or the like) 1201 that may perform various appropriate actions and processes based on a program stored in the ROM 1202 or loaded from the storage apparatus 1208 into the RAM 1203. In RAM 1203, various programs and data required for operation of electronic device 1200 are also stored. The processing apparatus 1201, ROM 1202, and RAM 1203 are connected to each other via bus 1204. The input/output (I/O) interface 1205 is also connected to the bus 1204.

Typically, the following devices may be connected to I/O interface 1205: input apparatus 1206 including, for example, touch screens, touch pads, keyboards, mice, cameras, microphones, accelerometers, gyroscopes, or the like, output apparatus 1207 including, for example, liquid crystal displays (LCDs), speakers, vibrators, or the like, storage apparatus 1208 including, for example, magnetic tapes, hard disks, or the like, and a communication apparatus 1209. The communication apparatus 1209 may allow the electronic device 1200 to communicate wirelessly or wired with other devices to exchange data. Although FIG. 12 illustrates an electronic device having various devices, it should be understood that it is not required to implement or have all of the devices illustrated. More or fewer devices may alternatively be implemented or available.

More particularly, according to embodiments of the disclosure, the process described above with reference to the flowchart may be implemented as a computer software program. For example, embodiments of the disclosure include a computer program product comprising a computer program carried on at least one non-transitory computer readable medium, the computer program comprising program code for performing the method shown in the flowchart. In such an embodiment of the disclosure, the computer program may be downloaded and installed from a network via the communication apparatus 1209, or from storage apparatus 1208, or from ROM 1202. When this computer program is executed by the processing apparatus 1201, the above-described functions as defined in the method of the embodiment of the disclosure are performed.

It is noted that the computer readable storage medium described above in the disclosure may be a computer readable signal medium or a computer readable storage medium or any combination of the above. The computer readable storage medium may, for example, be but not limited to an electrical, magnetic, optical, electromagnetic, infrared, or semiconductor system, apparatus, or device, or any combination of the above. More specific examples of computer readable storage media may include, but are not limited to electrically connected with one or more wires, portable computer disks, hard disks, a random access memory (RAM), a read-only memory (ROM), an erasable programmable read-only memory (EPROM or flash memory), optical fiber, a portable compact disc read-only memory (CD-ROM), optical storage devices, magnetic memory devices, or any suitable combination of the above. In this application, the computer readable storage medium may be any tangible medium that contains or stores a program that may be used by or in combination with an instruction execution system, apparatus, or device. In an embodiment of the disclosure, the computer readable signal medium may include a data signal propagated in the baseband or as part of a carrier wave that carries computer readable program code. This propagated data signal can take a variety of forms, including but not limited to electromagnetic signals, optical signals, or any suitable combination of the above. Computer readable signal medium can also be any computer readable medium other than computer readable storage media, the computer readable signal medium can send, propagate or transmit the program for use by or in combination with the instruction execution system, apparatus or device. The program code contained on the computer readable medium may be transmitted using any suitable medium, including, but not limited to: wire, fiber optic cable, radio frequency RF), or the like, or any suitable combination of the foregoing.

In some implementations, the client, server may communicate using any currently known or future developed network protocol, such as hypertext transfer protocol (HTTP), and may interconnect with any form or medium of digital data communication (e.g., a communications network). Examples of communication networks include local area networks (LANs), wide area networks (WANs), inter-networks (e.g., the Internet), and end-to-end networks (e.g., ad hoc end-to-end networks), as well as any currently known or future developed networks.

The above computer readable medium may be included in the above electronic device, or it may be separate and not assembled into the electronic device.

The above computer readable medium carries one or more programs which, when executed by the electronic device, cause the electronic device to determine resource usage status information for the current first preset period, and determine the control resource set CORESET time-frequency resources and UL/DL control channel element CCE patterns for the current first preset period based on the resource usage status information.

The computer program code for performing the operations of the disclosure may be written in one or more programming languages or combinations thereof, the programming languages including, but not limited to, object-oriented programming languages-such as Java, Smalltalk, C++, and also including procedural programming languages-such as "C" language or similar programming languages of the related art. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network-including a local area network (LAN) or a wide area network (WAN)-or, alternatively, may be connected to an external computer (e.g., using an Internet service provider to connect over the Internet).

The flowcharts and block diagrams in the accompanying drawings illustrate the possible architectures, functions, and operations of the systems, methods, and computer program products in accordance with various embodiments of the disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The modules or units described in the embodiments covered in this application can be implemented by means of software or by means of hardware. For example, the first data acquisition module may also be described as "a module for acquiring first data"

The functions described above herein may be performed, at least in part, by one or more hardware logic components. For example, non-limitingly, hardware logic components that may be used include field-programmable gate arrays (FPGAs), application-specific integrated circuits (ASICs), application-specific standard products (ASSPs), systems-on-chip (SOCs), complex programmable logic devices (CPLDs), and the like.

In the context of this application, a machine-readable medium may be a tangible medium that may contain or store a program for use by or in conjunction with an instruction execution system, apparatus, or device. The machine-readable medium may be a machine-readable signal medium or a machine-readable storage medium. Machine readable media may include, but are not limited to, electronic, magnetic, optical, electromagnetic, infrared, or semiconductor systems, devices, or devices, or any suitable combination of the foregoing. More specific examples of machine-readable storage media would include one or more wire-based electrical connections, portable computer disks, hard disks, a random access memory (RAM), a read-only memory (ROM), an erasable programmable read-only memory (EPROM or flash memory), optical fiber, a compact disc read-only memory (CD-ROM), an optical storage device, a magnetic storage device, or any suitable combination of the foregoing.

At least one of a plurality of modules of the device provided in this embodiment of the disclosure may be implemented by means of an AI model. The functions associated with the AI may be performed through non-volatile memory, volatile memory, and a processor.

The processor may include one or more processors. In this case, the one or more processors may be a general purpose processor, such as a central processing unit (CPU), an application processor (AP), or the like, or a pure graphics processing unit, for example, a graphics processing unit (GPU), a visual processing unit (VPU), and/or an AI-specific processor, such as a neural processing unit (NPU).

The one or more processors control the processing of the input data based on predefined operational rules or artificial intelligence (AI) models stored in non-volatile memory and volatile memory. The predefined operation rules or AI models are provided by training or learning.

Here, providing by learning refers to acquiring predefined operating rules or AI models with desired characteristics by applying a learning algorithm to a plurality of learned data. The learning may be performed in the device itself in which the AI according to the embodiment is executed, and/or may be implemented by a separate server/system.

The AI model may include a plurality of neural network layers. Each layer has a plurality of weight values, and the computation of a layer is performed by the results of the computation of the previous layer and the plurality of weights of the current layer. Examples of neural networks include, but are not limited to, convolutional neural networks (CNNs), deep neural networks (DNNs), recurrent neural networks (RNNs), restricted Boltzmann machines (RBMs), deep belief networks (DBNs), bidirectional recurrent deep neural networks (BRDNNs), generative adversarial networks (GANs), and deep Q networks.

The learning algorithm is a method of training a preset target apparatus (e.g., a robot) using multiple learning data to enable, allow, or control the target device to make determinations or predictions. Examples of the learning algorithm include, but are not limited to, supervised learning, unsupervised learning, semi-supervised learning, or reinforcement learning.

It will be clear to those skilled in the art that for ease and brevity of description, the specific methods described above that are implemented when the computer readable medium is executed by the electronic device can be referred to the corresponding processes in the preceding method embodiments and will not be repeated herein.

It should be understood that although the individual steps in the flow chart of the accompanying drawings are shown sequentially as indicated by the arrows, these steps are not necessarily performed sequentially in the order indicated by the arrows. Except as expressly stated herein, there is no strict order in which these steps are performed and they may be performed in any other order. Moreover, at least some of the steps in the flowchart of the accompanying drawings may include a plurality of sub-steps or a plurality of phases, which are not necessarily executed at the same moment of completion, but may be executed at different moments, and the order of their execution is not necessarily sequential, but may be executed in rotation or alternately with other steps or at least some of the sub-steps or phases of other steps.

While the disclosure has been shown and described with reference to various embodiments thereof, and it will be understood by those skilled in the art that various changes in form and details may be made therein without departing from the spirit and scope of the disclosure as defined by the appended claims and their equivalents.

What is claimed is:

1. A method for allocating control resources in an electronic device, the method comprising:
   identifying resource usage status information for a first period; and
   determining control resource set (CORESET) time-frequency resources and uplink (UL)/downlink (DL) control channel element (CCE) patterns for the first period based on the resource usage status information,
   wherein the resource usage status information comprises information on a number of CCEs required for a UL/DL, and
   wherein the identifying of resource usage status information for the first period comprises:
      determining an impact factor corresponding to a number of CCEs banned for UL/DL based on a ratio of CCEs banned for UL/DL; and
      acquiring the number of CCEs required for UL/DL based on a CCE utilization rate, a number of CCEs used for UL/DL, the number of CCEs banned for UL/DL, and the impact factor.

2. The method of claim 1, wherein the identifying of resource usage status information for the first period comprises:
   acquiring historical resource usage status information for at least one period before the first period; and
   identifying the resource usage status information for the first period based on the historical resource usage status information.

3. The method of claim 2, wherein the acquiring of the historical resource usage status information comprises:
   acquiring the number of CCEs used for UL/DL, the number of CCEs banned for UL/DL, and a total number of CCEs available for UL/DL; and
   acquiring the number of CCEs required for UL/DL based on the number of CCEs used for UL/DL, the number of CCEs banned for UL/DL, and the total number of CCEs available for UL/DL.

4. The method of claim 3, wherein the acquiring of the number of CCEs required for UL/DL comprises:
   acquiring the CCE utilization rate based on the number of CCEs used for UL/DL and the total number of CCEs available for UL/DL,
   acquiring the ratio of CCEs banned for UL/DL based on the number of CCEs banned for UL/DL and the total number of CCEs available for UL/DL; and
   acquiring the number of CCEs required for UL/DL based on the CCE utilization rate, the number of CCEs used for UL/DL, the number of CCEs banned for UL/DL, and the impact factor.

5. The method of claim 2, wherein the identifying of the resource usage status information for the first period based on the historical resource usage status information comprises:
   predicting the resource usage status information for the first period by using a prediction model based on the historical resource usage status information.

6. The method of claim 1, wherein the determining of the CORESET time-frequency resources and the UL/DL CCE patterns for the first period based on the resource usage status information comprises:
   determining the CORESET time-frequency resources for the first period based on the resource usage status information; and
   determining the UL/DL CCE patterns for the first period based on the CORESET time-frequency resources.

7. The method of claim 6,
   wherein the resource usage status information comprises the number of CCEs required for the UL/DL and a data resource utilization rate, and
   wherein the determining of the CORESET time-frequency resources for the first period based on the resource usage status information comprises:
      determining CORESET time domain resources for the first period based on the number of CCEs required for UL/DL and the data resource utilization rate;
      acquiring required CORESET frequency domain resources based on the number of CCEs required for UL/DL and the CORESET time domain resources; and
      determining CORESET frequency domain resources for the first period based on the required CORESET frequency domain resources for the-UL/DL and the CORESET time domain resources.

8. The method of claim 6,
wherein the resource usage status information comprises the number of CCEs required for the UL/DL, and
wherein the determining of the UL/DL CCE patterns for the first period based on the CORESET time-frequency resources comprises:
   determining the UL/DL CCE patterns for the first period based on the number of CCEs required for UL/DL and the CORESET time-frequency resources.

9. The method of claim 8, wherein the determining of the UL/DL CCE patterns for the first period based on the number of CCEs required for UL/DL and the CORESET time-frequency resources comprises:
   acquiring a ratio of CCEs required for UL/DL based on the number of CCEs required for UL/DL for the first period; and
   determining the UL/DL CCE patterns for the first period based on the ratio of CCEs required for UL/DL and the CORESET time-frequency resources.

10. The method of claim 9, wherein the acquiring of the UL/DL CCE patterns for the first period based on the ratio of CCEs required for UL/DL and the CORESET time-frequency resources comprises:
   determining a total number of CCEs available for UL/DL based on the CORESET time-frequency resources;
   determining the UL/DL CCE patterns for the first period based on the ratio of CCEs required for UL/DL, predefined set of UL/DL CCE ratios, predefined set of the UL/DL CCE patterns, and the total number of CCEs available for UL/DL, if the ratio of CCEs required for UL/DL falls within a predefined range of UL/DL CCE ratios; and
   determining the UL/DL CCE patterns for the first period based on the ratio of CCEs required for UL/DL and the total number of CCEs available for UL/DL, if the ratio of CCEs required for UL/DL does not fall within a predefined UL/DL CCE ratio.

11. An electronic device comprising:
   at least one processor; and
   memory storing instructions that, when executed by the at least one processor individually or collectively, cause the electronic device to:
      identify resource usage status information for a first period, and
      determine control resource set (CORESET) time-frequency resources and uplink (UL)/downlink (DL) control channel element (CCE) patterns for the first period based on the resource usage status information,
   wherein the resource usage status information comprises information on a number of CCEs required for UL/DL, and
   wherein, to identify the resource usage status information for the first period, the instructions, when executed by the at least one processor individually or collectively, further cause the electronic device to:
      determine an impact factor corresponding to a number of CCEs banned for UL/DL based on a ratio of CCEs banned for UL/DL, and
      acquire the number of CCEs required for UL/DL based on a CCE utilization rate, a number of CCEs used for UL/DL, the number of CCEs banned for UL/DL, and the impact factor.

12. The electronic device of claim 11, wherein the instructions, when executed by the at least one processor individually or collectively, further cause the electronic device to:
   acquire historical resource usage status information for at least one period before the first period, and
   identify the resource usage status information for the first period based on the historical resource usage status information.

13. The electronic device of claim 12, wherein the instructions, when executed by the at least one processor individually or collectively, further cause the electronic device to:
   acquire the number of CCEs used for UL/DL, the number of CCEs banned for UL/DL, and a total number of CCEs available for UL/DL, and
   acquire the number of CCEs required for UL/DL based on the number of CCEs used for UL/DL, the number of CCEs banned for UL/DL, and the total number of CCEs available for UL/DL.

14. The electronic device of claim 13, wherein the instructions, when executed by the at least one processor individually or collectively, further cause the electronic device to:
   acquire the CCE utilization rate based on the number of CCEs used for UL/DL and the total number of CCEs available for UL/DL,
   acquiring the ratio of CCEs banned for UL/DL based on the number of CCEs banned for UL/DL and the total number of CCEs available for UL/DL, and
   acquire the number of CCEs required for UL/DL based on the CCE utilization rate, the number of CCEs used for UL/DL, the number of CCEs banned for UL/DL, and the impact factor.

15. The electronic device of claim 12, wherein the instructions, when executed by the at least one processor individually or collectively, further cause the electronic device to:
   predict the resource usage status information for the first period by using a prediction model based on the historical resource usage status information.

16. The electronic device of claim 11, wherein the instructions, when executed by the at least one processor individually or collectively, further cause the electronic device to:
   determine the CORESET time-frequency resources for the first period based on the resource usage status information, and
   determine the UL/DL CCE patterns for the first period based on the CORESET time-frequency resources.

17. The electronic device of claim 16,
wherein the resource usage status information comprises the number of CCEs required for the UL/DL and a data resource utilization rate, and
wherein the instructions, when executed by the at least one processor individually or collectively, further cause the electronic device to:
   determine CORESET time domain resources for the first period based on the number of CCEs required for UL/DL and the data resource utilization rate,
   acquire required CORESET frequency domain resources based on the number of CCEs required for UL/DL and the CORESET time domain resources, and
   determine CORESET frequency domain resources for the first period based on the required CORESET frequency domain resources for UL/DL and the CORESET time domain resources.

18. The electronic device of claim 16,
wherein the resource usage status information comprises the number of CCEs required for the UL/DL, and
wherein the instructions, when executed by the at least one processor individually or collectively, further cause the electronic device to:

determine the UL/DL CCE patterns for the first period based on the number of CCEs required for UL/DL and the CORESET time-frequency resources.

19. The electronic device of claim 18, wherein the instructions, when executed by the at least one processor individually or collectively, further cause the electronic device to:
   acquire a ratio of CCEs required for UL/DL based on the number of CCEs required for UL/DL for the first period, and
   determine the UL/DL CCE patterns for the first period based on the ratio of CCEs required for UL/DL and the CORESET time-frequency resources.

20. The electronic device of claim 19, wherein the instructions, when executed by the at least one processor individually or collectively, further cause the electronic device to:
   determine a total number of CCEs available for UL/DL based on the CORESET time-frequency resources,
   determine the UL/DL CCE patterns for the first period based on the ratio of CCEs required for UL/DL, predefined set of UL/DL CCE ratios, predefined set of the UL/DL CCE patterns, and the total number of CCEs available for UL/DL, if the ratio of CCEs required for UL/DL falls within a predefined range of UL/DL CCE ratios, and
   determine the UL/DL CCE patterns for the first period based on the ratio of CCEs required for UL/DL and the total number of CCEs available for UL/DL, if the ratio of CCEs required for UL/DL does not fall within a predefined UL/DL CCE ratio.

* * * * *